(12) United States Patent
Khoshnevisan et al.

(10) Patent No.: US 12,261,793 B2
(45) Date of Patent: Mar. 25, 2025

(54) COMMUNICATIONS ASSOCIATED WITH DIFFERENT SOUNDING REFERENCE SIGNAL RESOURCE SETS

(71) Applicant: QUALCOMM Incorporated, San Diego, CA (US)

(72) Inventors: Mostafa Khoshnevisan, San Diego, CA (US); Yitao Chen, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 52 days.

(21) Appl. No.: 17/898,247

(22) Filed: Aug. 29, 2022

(65) Prior Publication Data

US 2023/0101753 A1 Mar. 30, 2023

Related U.S. Application Data

(60) Provisional application No. 63/261,865, filed on Sep. 30, 2021.

(51) Int. Cl.
*H04L 25/02* (2006.01)
*H04L 5/00* (2006.01)
*H04W 72/23* (2023.01)

(52) U.S. Cl.
CPC ........... *H04L 5/0048* (2013.01); *H04W 72/23* (2023.01)

(58) Field of Classification Search
CPC .............................. H04L 5/0048; H04W 72/23
See application file for complete search history.

(56) References Cited

U.S. PATENT DOCUMENTS 11,523,349 B1 * 12/2022 Huang .................. H04W 52/40
2020/0351129 A1    11/2020 Kwak et al.
2021/0235386 A1 *  7/2021 Zhang .................. H04W 52/42
(Continued)

FOREIGN PATENT DOCUMENTS

WO    2020162716 A1    8/2020
WO    2021090168 A1    5/2021

OTHER PUBLICATIONS

International Search Report and Written Opinion—PCT/US2022/075662—ISA/EPO—Nov. 29, 2022.
(Continued)

*Primary Examiner* — John D Blanton
(74) *Attorney, Agent, or Firm* — Harrity & Harrity, LLP

(57) ABSTRACT

Various aspects of the present disclosure generally relate to wireless communication. In some aspects, a mobile station may receive configuration information indicating sounding reference signal (SRS) resource sets, the configuration information indicating: a first set of SRS resource sets, of the SRS resource sets, associated with a first downlink control information (DCI) format, and a second set of SRS resource sets, of the SRS resource sets, associated with a second DCI format, wherein at least one of the first set or the second set comprises at least two of the SRS resource sets. The mobile station may transmit, based at least in part on the configuration information, at least one uplink communication using at least one SRS resource of at least one of the SRS resource sets of at least one of the first set or the second set. Numerous other aspects are described.

30 Claims, 13 Drawing Sheets

(56) References Cited

U.S. PATENT DOCUMENTS

| | | |
|---|---|---|
| 2022/0116979 A1 | 4/2022 | Park et al. |
| 2022/0123799 A1* | 4/2022 | Varatharaajan ....... H04L 5/0094 |
| 2022/0302966 A1* | 9/2022 | Sun ....................... H04W 72/23 |
| 2022/0322393 A1* | 10/2022 | Lin ....................... H04W 72/23 |
| 2022/0338027 A1* | 10/2022 | Gao ................. H04W 74/0866 |
| 2022/0361202 A1* | 11/2022 | Yi ......................... H04W 24/10 |
| 2023/0012515 A1* | 1/2023 | Jiang ..................... H04L 5/0051 |

OTHER PUBLICATIONS

Vivo: "Further Discussion on Multi-TRP for PDCCH, PUCCH and PUSCH Enhancements", 3GPP TSG RAN WG1 #106-e, R1-2106572, 3rd Generation Partnership Project, Mobile Competence Centre, 650, Route Des Lucioles, F-06921 Sophia-Antipolis Cedex, France , vol. RAN WG1, No. e-Meeting, Aug. 16, 2021-Aug. 27, 2021, 28 Pages, Aug. 2021, XP052037878, p. 12, p. 24.

* cited by examiner

COMMUNICATIONS ASSOCIATED WITH DIFFERENT SOUNDING REFERENCE SIGNAL RESOURCE SETS

CROSS-REFERENCE TO RELATED APPLICATION

This Patent Application claims priority to U.S. Provisional Patent Application No. 63/261,865, filed on Sep. 30, 2021, entitled "COMMUNICATIONS ASSOCIATED WITH DIFFERENT SOUNDING REFERENCE SIGNAL RESOURCE SETS," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for communications associated with different sounding reference signal resource sets.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a mobile station. The method may include receiving, by the mobile station, configuration information indicating a plurality of sounding reference signal (SRS) resource sets, the configuration information indicating: a first set of SRS resource sets, of the plurality of SRS resource sets, associated with a first downlink control information (DCI) format, and a second set of SRS resource sets, of the plurality of SRS resource sets, associated with a second DCI format, where at least one of the first set or the second set comprises at least two of the plurality of SRS resource sets. The method may include transmitting, by the mobile station and based at least in part on the configuration information, at least one uplink communication using at least one SRS resource of at least one of the SRS resource sets of at least one of the first set or the second set.

Some aspects described herein relate to a method of wireless communication performed by a base station. The method may include transmitting, by the base station and to a mobile station, configuration information indicating a plurality of SRS resource sets, the configuration information indicating: a first set of SRS resource sets, of the plurality of SRS resource sets, associated with a first DCI format, and a second set of SRS resource sets, of the plurality of SRS resource sets, associated with a second DCI format, where at least one of the first set or the second set comprises at least two of the plurality of SRS resource sets. The method may include receiving, by the base station and based at least in part on the configuration information, at least one uplink communication using at least one SRS resource of at least one of the SRS resource sets of at least one of the first set or the second set.

Some aspects described herein relate to a mobile station for wireless communication. The mobile station may include a memory and one or more processors coupled to the memory. The one or more processors may be configured to receive configuration information indicating a plurality of SRS resource sets, the configuration information indicating: a first set of SRS resource sets, of the plurality of SRS resource sets, associated with a first DCI format, and a second set of SRS resource sets, of the plurality of SRS resource sets, associated with a second DCI format, where at least one of the first set or the second set comprises at least two of the plurality of SRS resource sets. The one or more processors may be configured to transmit, based at least in part on the configuration information, at least one uplink communication using at least one SRS resource of at least one of the SRS resource sets of at least one of the first set or the second set.

Some aspects described herein relate to a base station for wireless communication. The base station may include a memory and one or more processors coupled to the memory. The one or more processors may be configured to transmit, to a mobile station, configuration information indicating a plurality of SRS resource sets, the configuration information indicating: a first set of SRS resource sets, of the plurality of SRS resource sets, associated with a first DCI format, and a second set of SRS resource sets, of the plurality of SRS resource sets, associated with a second DCI format, where at least one of the first set or the second set comprises at least two of the plurality of SRS resource sets. The one or more processors may be configured to receive, based at least in part on the configuration information, at least one uplink communication using at least one SRS resource of at least one of the SRS resource sets of at least one of the first set or the second set.

Some aspects described herein relate to a non-transitory computer-readable medium that stores a set of instructions for wireless communication by a mobile station. The set of instructions, when executed by one or more processors of the mobile station, may cause the mobile station to receive configuration information indicating a plurality of SRS resource sets, the configuration information indicating: a first set of SRS resource sets, of the plurality of SRS resource sets, associated with a first DCI format, and a second set of SRS resource sets, of the plurality of SRS resource sets, associated with a second DCI format, where at least one of the first set or the second set comprises at least two of the plurality of SRS resource sets. The set of instructions, when executed by one or more processors of the mobile station, may cause the mobile station to transmit, based at least in part on the configuration information, at least one uplink communication using at least one SRS resource of at least one of the SRS resource sets of at least one of the first set or the second set.

Some aspects described herein relate to a non-transitory computer-readable medium that stores a set of instructions for wireless communication by a base station. The set of instructions, when executed by one or more processors of the base station, may cause the base station to transmit, to a mobile station, configuration information indicating a plurality of SRS resource sets, the configuration information indicating: a first set of SRS resource sets, of the plurality of SRS resource sets, associated with a first DCI format, and a second set of SRS resource sets, of the plurality of SRS resource sets, associated with a second DCI format, where at least one of the first set or the second set comprises at least two of the plurality of SRS resource sets. The set of instructions, when executed by one or more processors of the base station, may cause the base station to receive, based at least in part on the configuration information, at least one uplink communication using at least one SRS resource of at least one of the SRS resource sets of at least one of the first set or the second set.

Some aspects described herein relate to an apparatus for wireless communication. The apparatus may include means for receiving configuration information indicating a plurality of SRS resource sets, the configuration information indicating: a first set of SRS resource sets, of the plurality of SRS resource sets, associated with a first DCI format, and a second set of SRS resource sets, of the plurality of SRS resource sets, associated with a second DCI format, where at least one of the first set or the second set comprises at least two of the plurality of SRS resource sets. The apparatus may include means for transmitting, based at least in part on the configuration information, at least one uplink communication using at least one SRS resource of at least one of the SRS resource sets of at least one of the first set or the second set.

Some aspects described herein relate to an apparatus for wireless communication. The apparatus may include means for transmitting, to a mobile station, configuration information indicating a plurality of SRS resource sets, the configuration information indicating: a first set of SRS resource sets, of the plurality of SRS resource sets, associated with a first DCI format, and a second set of SRS resource sets, of the plurality of SRS resource sets, associated with a second DCI format, where at least one of the first set or the second set comprises at least two of the plurality of SRS resource sets. The apparatus may include means for receiving, based at least in part on the configuration information, at least one uplink communication using at least one SRS resource of at least one of the SRS resource sets of at least one of the first set or the second set.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effec

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
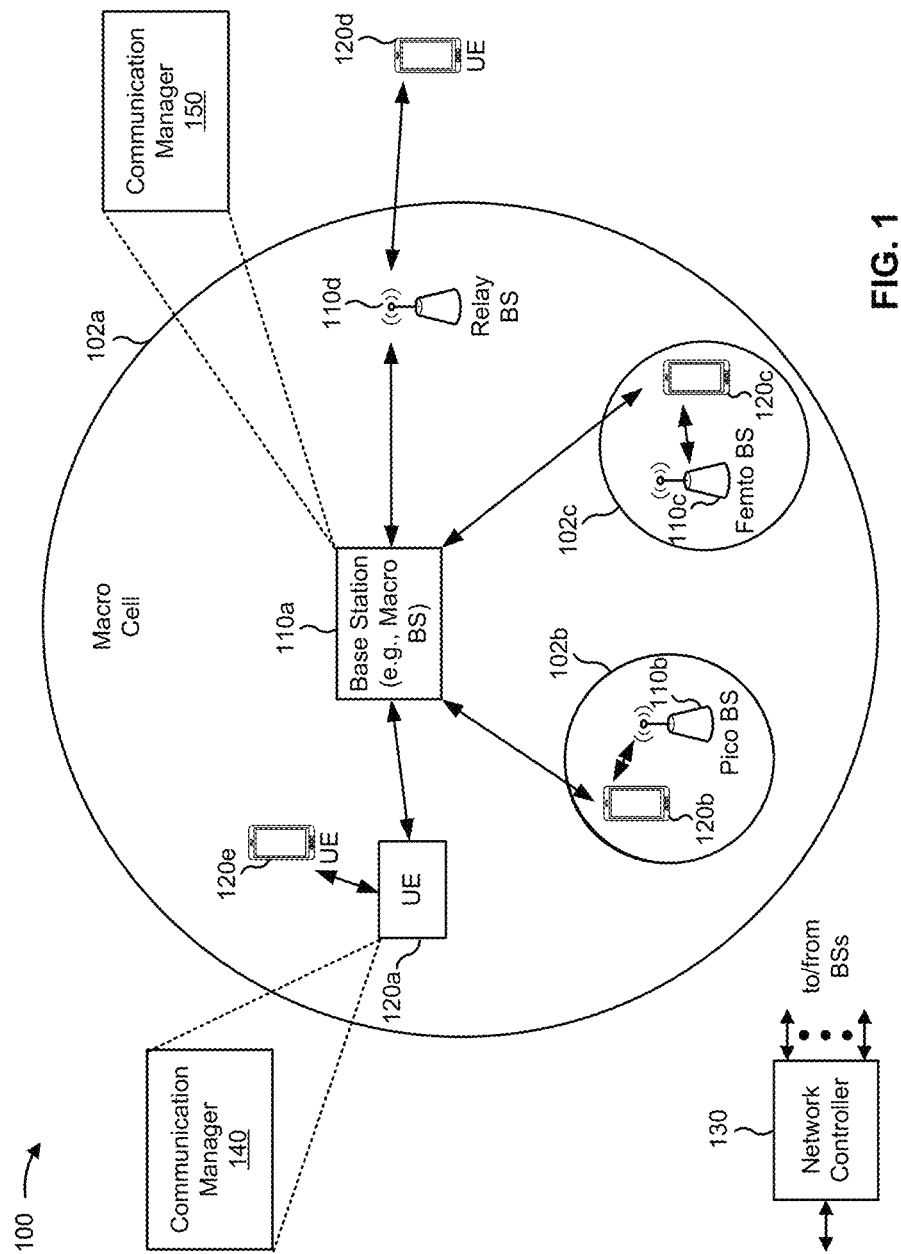
- FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110*a*, a BS 110*b*, a BS 110*c*, and a BS 110*d*), a user equipment (UE) 120 (sometimes referred to as a mobile station) or multiple UEs 120 (shown as a UE 120*a*, a UE 120*b*, a UE 120*c*, a UE 120*d*, and a UE 120*e*), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110*a* may be a macro base station for a macro cell 102*a*, the BS 110*b* may be a pico base station for a pico cell 102*b*, and the BS 110*c* may be a femto base station for a femto cell 102*c*. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the mobile station may include a communication manager 140. As described in more detail elsewhere herein, the communication manager 140 may receive configuration information indicating a plurality of sounding reference signal (SRS) resource sets, the configuration information indicating: a first set of SRS resource sets, of the plurality of SRS resource sets, associated with a first downlink control information (DCI) format, and a second set of SRS resource sets, of the plurality of SRS resource sets, associated with a second DCI format, wherein at least one of the first set or the second set comprises at least two of the plurality of SRS resource sets; and transmit, based at least in part on the configuration information, at least one uplink communication using at least one SRS resource of at least one of the SRS resource sets of at least one of the first set or the second set. Additionally, or alternatively, the communication manager 140 may perform one or more other operations described herein.

In some aspects, the base station 110 may include a communication manager 150. As described in more detail elsewhere herein, the communication manager 150 may transmit, to a mobile station, configuration information indicating a plurality of SRS resource sets, the configuration information indicating: a first set of SRS resource sets, of the plurality of SRS resource sets, associated with a first DCI format, and a second set of SRS resource sets, of the plurality of SRS resource sets, associated with a second DCI format, wherein at least one of the first set or the second set comprises at least two of the plurality of SRS resource sets; and receive, based at least in part on the configuration information, at least one uplink communication using at least one SRS resource of at least one of the SRS resource sets of at least one of the first set or the second set. Additionally, or alternatively, the communication manager 150 may perform one or more other operations described herein.

As indicated above, FIG. 1 is provided as an example. Other examples may differ from what is described with regard to FIG. 1.

Figure 2:
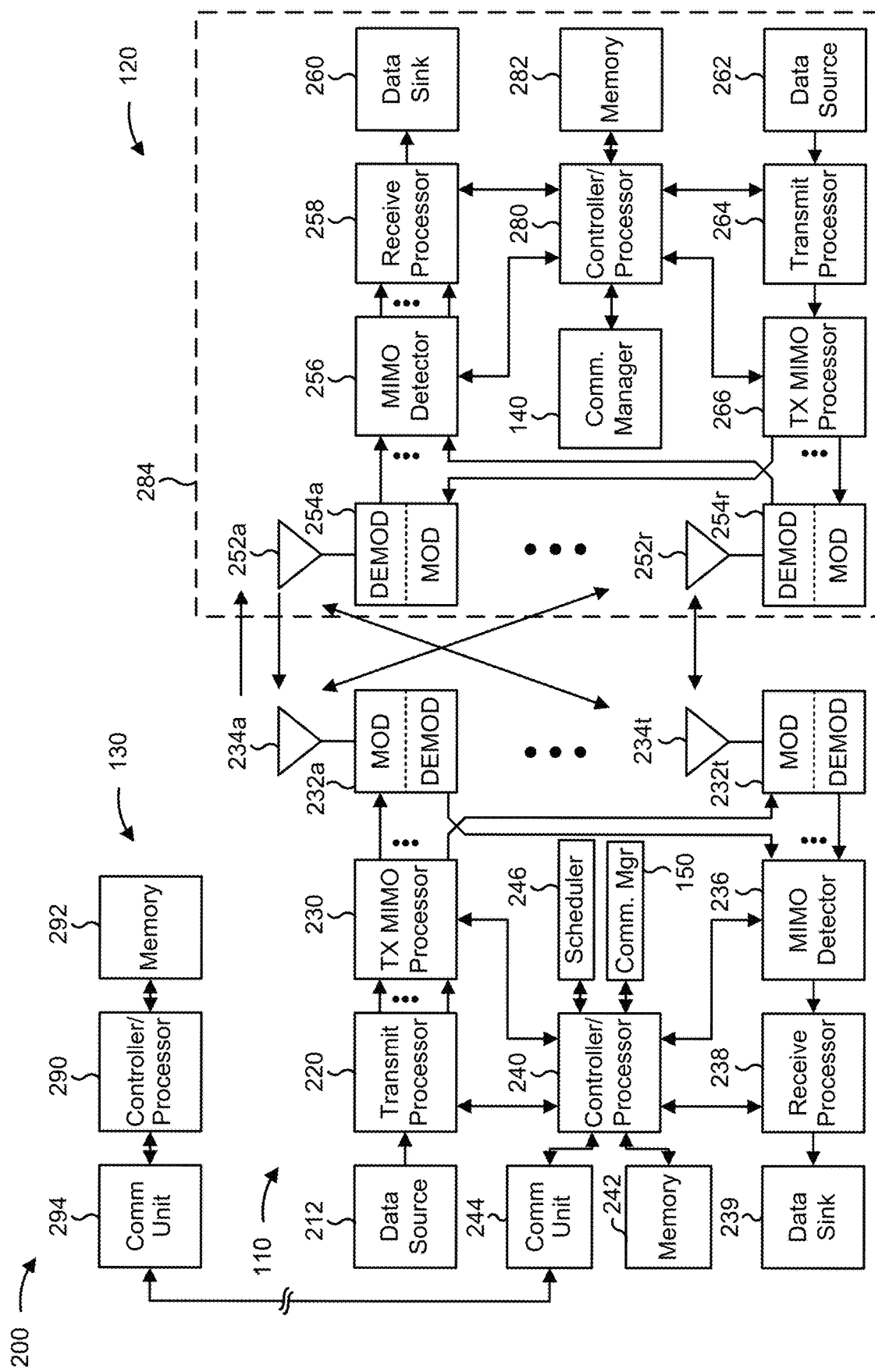
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 3-13).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 3-13).

The controller/processor 240 of the base station 110, the controller/processor 280 of the UE 120, and/or any other component(s) of FIG. 2 may perform one or more techniques associated with communications associated with different sounding reference signal (SRS) resource sets, as described in more detail elsewhere herein. For example, the controller/processor 240 of the base station 110, the controller/processor 280 of the UE 120, and/or any other component(s) of FIG. 2 may perform or direct operations of, for example, process 1000 of FIG. 10, process 1100 of FIG. 11, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 1000 of FIG. 10, process 1100 of FIG. 11, and/or other processes as described herein. In some examples, executing instructions may include running the instructions, converting the instructions, compiling the instructions, and/or interpreting the instructions, among other examples.

In some aspects, the mobile station (e.g., UE 120) includes means for receiving, by the mobile station, configuration information indicating a plurality of SRS resource sets, the configuration information indicating: a first set of SRS resource sets, of the plurality of SRS resource sets, associated with a first DCI format, and a second set of SRS resource sets, of the plurality of SRS resource sets, associated with a second DCI format, wherein at least one of the first set or the second set comprises at least two of the plurality of SRS resource sets; and/or means for transmitting, by the mobile station and based at least in part on the configuration information, at least one uplink communication using at least one SRS resource of at least one of the SRS resource sets of at least one of the first set or the second set. The means for the mobile station to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the base station includes means for transmitting, by the base station and to a mobile station, configuration information indicating a plurality of SRS resource sets, the configuration information indicating: a first set of SRS resource sets, of the plurality of SRS resource sets, associated with a first DCI format, and a second set of SRS resource sets, of the plurality of SRS resource sets, associated with a second DCI format, wherein at least one of the first set or the second set comprises at least two of the plurality of SRS resource sets; and/or means for receiving, by the base station and based at least in part on the configuration information, at least one uplink communication using at least one SRS resource of at least one of the SRS resource sets of at least one of the first set or the second set. The means for the base station to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
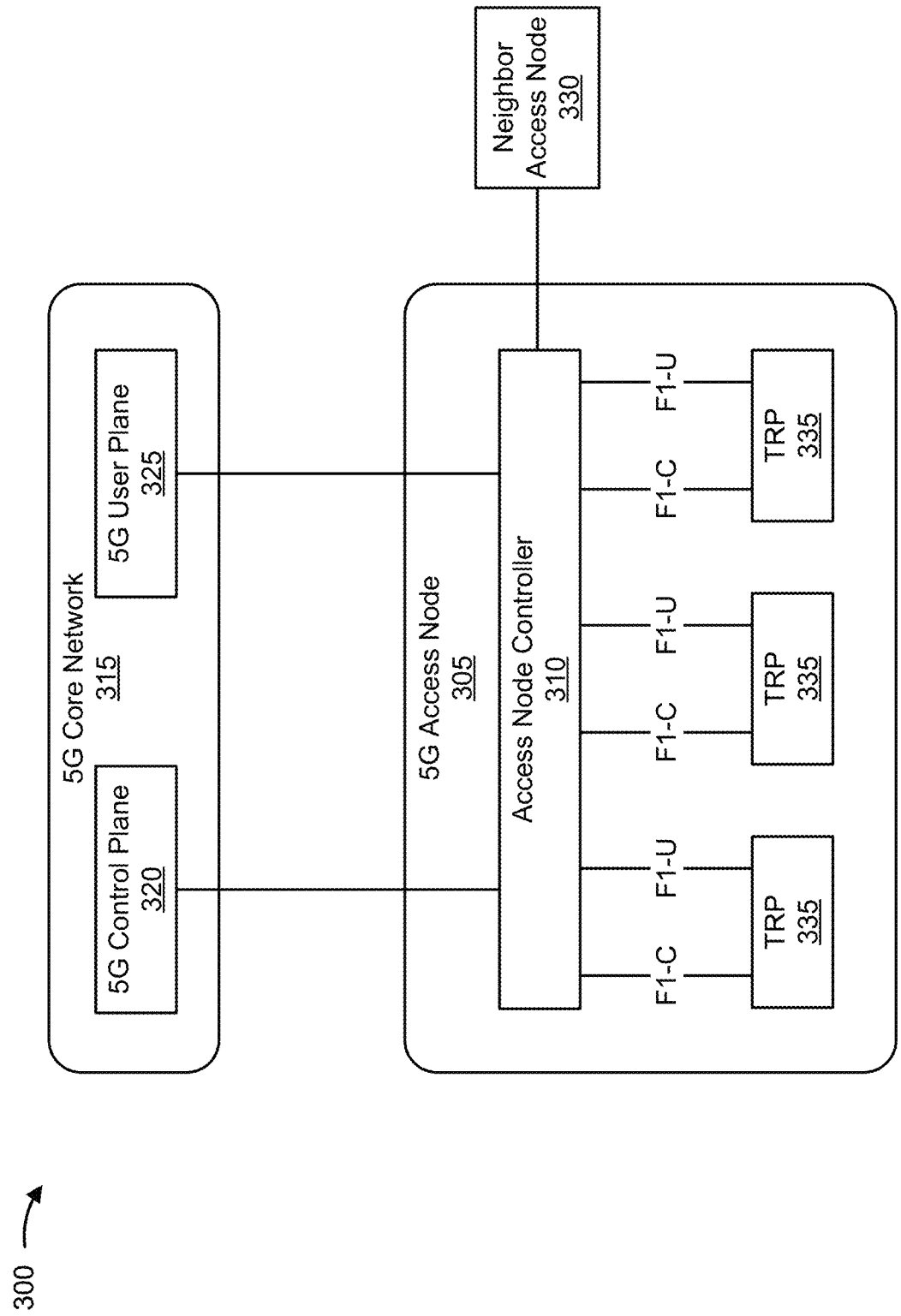
FIG. 3 illustrates an example logical architecture of a distributed radio access network (RAN), in accordance with the present disclosure.

FIG. 3 illustrates an example logical architecture of a distributed RAN 300, in accordance with the present disclosure.

A 5G access node 305 may include an access node controller 310. The access node controller 310 may be a central unit (CU) of the distributed RAN 300. In some aspects, a backhaul interface to a 5G core network 315 may terminate at the access node controller 310. The 5G core network 315 may include a 5G control plane component 320 and a 5G user plane component 325 (e.g., a 5G gateway), and the backhaul interface for one or both of the 5G control plane and the 5G user plane may terminate at the access node controller 310. Additionally, or alternatively, a backhaul interface to one or more neighbor access nodes 330 (e.g., another 5G access node 305 and/or an LTE access node) may terminate at the access node controller 310.

The access node controller 310 may include and/or may communicate with one or more TRPs 335 (e.g., via an F1

Control (F1-C) interface and/or an F1 User (F1-U) interface). A TRP 335 may be a distributed unit (DU) of the distributed RAN 300. In some aspects, a TRP 335 may correspond to a base station 110 described above in connection with FIG. 1. For example, different TRPs 335 may be included in different base stations 110. Additionally, or alternatively, multiple TRPs 335 may be included in a single base station 110. In some aspects, a base station 110 may include a CU (e.g., access node controller 310) and/or one or more DUs (e.g., one or more TRPs 335). In some cases, a TRP 335 may be referred to as a cell, a panel, an antenna array, or an array.

A TRP 335 may be connected to a single access node controller 310 or to multiple access node controllers 310. In some aspects, a dynamic configuration of split logical functions may be present within the architecture of distributed RAN 300. For example, a packet data convergence protocol (PDCP) layer, a radio link control (RLC) layer, and/or a medium access control (MAC) layer may be configured to terminate at the access node controller 310 or at a TRP 335.

In some aspects, multiple TRPs 335 may transmit communications (e.g., the same communication or different communications) in the same transmission time interval (TTI) (e.g., a slot, a mini-slot, a subframe, or a symbol) or different TTIs using different quasi-colocation (QCL) relationships (e.g., different spatial parameters, different transmission configuration indicator (TCI) states, different precoding parameters, and/or different beamforming parameters). In some aspects, a TCI state may be used to indicate one or more QCL relationships. A TRP 335 may be configured to individually (e.g., using dynamic selection) or jointly (e.g., using joint transmission with one or more other TRPs 335) serve traffic to a UE 120.

As indicated above, FIG. 3 is provided as an example. Other examples may differ from what was described with regard to FIG. 3.

Figure 4:
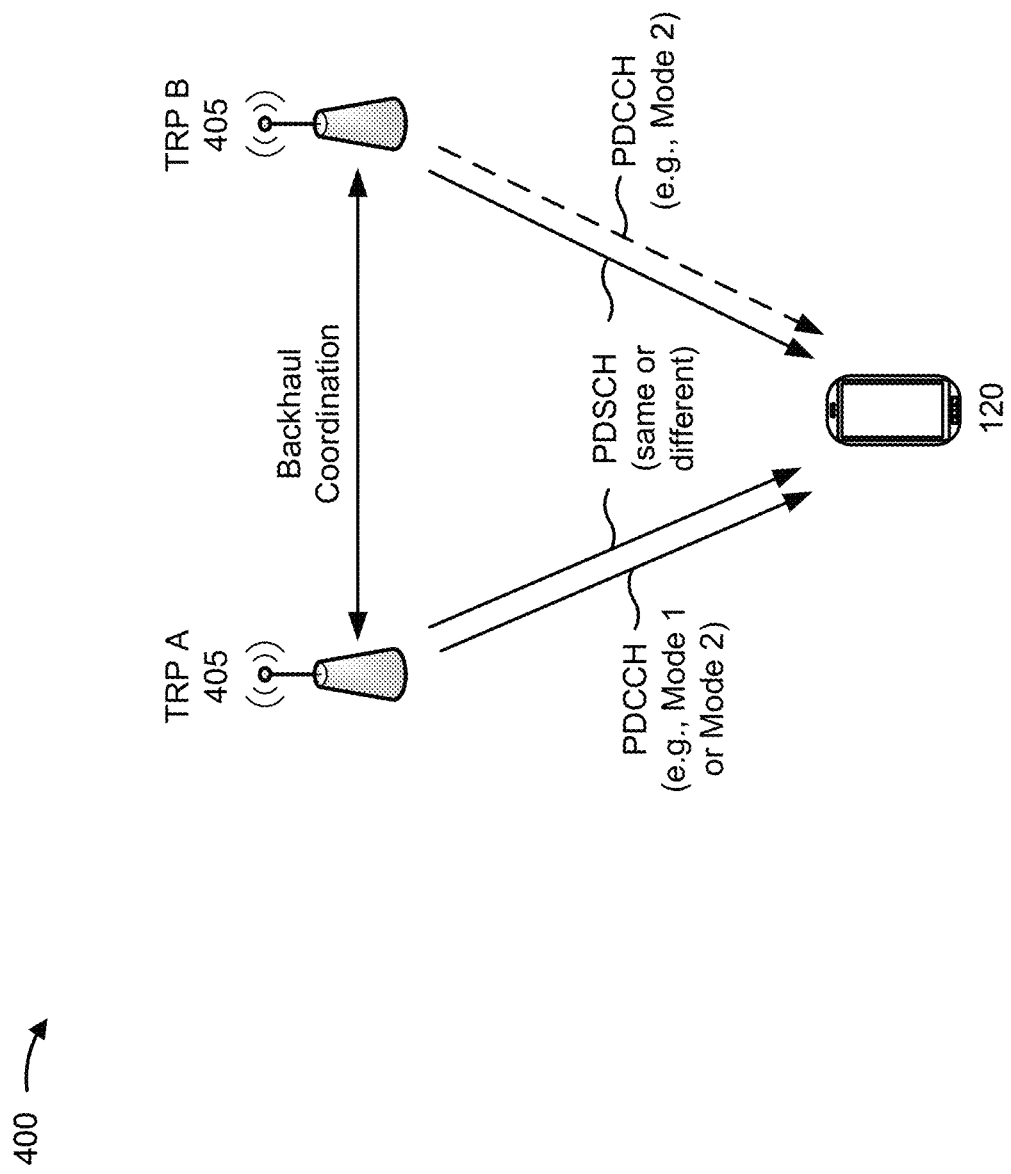
FIG. 4 is a diagram illustrating an example of multiple transmit receive point (multi-TRP) communication, in accordance with the present disclosure.

FIG. 4 is a diagram illustrating an example 400 of multi-TRP communication (sometimes referred to as multi-panel communication), in accordance with the present disclosure. As shown in FIG. 4, multiple TRPs 405 may communicate with the same UE 120. A TRP 405 may correspond to a TRP 335 described above in connection with FIG. 3.

The multiple TRPs 405 (shown as TRP A and TRP B) may communicate with the same UE 120 in a coordinated manner (e.g., using coordinated multipoint transmissions) to improve reliability and/or increase throughput. The TRPs 405 may coordinate such communications via an interface between the TRPs 405 (e.g., a backhaul interface and/or an access node controller 310). The interface may have a smaller delay and/or higher capacity when the TRPs 405 are co-located at the same base station 110 (e.g., when the TRPs 405 are different antenna arrays or panels of the same base station 110), and may have a larger delay and/or lower capacity (as compared to co-location) when the TRPs 405 are located at different base stations 110. The different TRPs 405 may communicate with the UE 120 using different QCL relationships (e.g., different TCI states), different demodulation reference signal (DMRS) ports, and/or different layers (e.g., of a multi-layer communication).

In a first multi-TRP transmission mode (e.g., Mode 1), a single physical downlink control channel (PDCCH) may be used to schedule downlink data communications for a single physical downlink shared channel (PDSCH). In this case, multiple TRPs 405 (e.g., TRP A and TRP B) may transmit communications to the UE 120 on the same PDSCH. For example, a communication may be transmitted using a single codeword with different spatial layers for different TRPs 405 (e.g., where one codeword maps to a first set of layers transmitted by a first TRP 405 and maps to a second set of layers transmitted by a second TRP 405). As another example, a communication may be transmitted using multiple codewords, where different codewords are transmitted by different TRPs 405 (e.g., using different sets of layers). In either case, different TRPs 405 may use different QCL relationships (e.g., different TCI states) for different DMRS ports corresponding to different layers. For example, a first TRP 405 may use a first QCL relationship or a first TCI state for a first set of DMRS ports corresponding to a first set of layers, and a second TRP 405 may use a second (different) QCL relationship or a second (different) TCI state for a second (different) set of DMRS ports corresponding to a second (different) set of layers. In some aspects, a TCI state in DCI (e.g., transmitted on the PDCCH, such as DCI format 1_0 or DCI format 1_1) may indicate the first QCL relationship (e.g., by indicating a first TCI state) and the second QCL relationship (e.g., by indicating a second TCI state). The first and the second TCI states may be indicated using a TCI field in the DCI. In general, the TCI field can indicate a single TCI state (for single-TRP transmission) or multiple TCI states (for multi-TRP transmission as discussed here) in this multi-TRP transmission mode (e.g., Mode 1).

In a second multi-TRP transmission mode (e.g., Mode 2), multiple PDCCHs may be used to schedule downlink data communications for multiple corresponding PDSCHs (e.g., one PDCCH for each PDSCH). In this case, a first PDCCH may schedule a first codeword to be transmitted by a first TRP 405, and a second PDCCH may schedule a second codeword to be transmitted by a second TRP 405. Furthermore, first DCI (e.g., transmitted by the first TRP 405) may schedule a first PDSCH communication associated with a first set of DMRS ports with a first QCL relationship (e.g., indicated by a first TCI state) for the first TRP 405, and second DCI (e.g., transmitted by the second TRP 405) may schedule a second PDSCH communication associated with a second set of DMRS ports with a second QCL relationship (e.g., indicated by a second TCI state) for the second TRP 405. In this case, DCI (e.g., having DCI format 1_0 or DCI format 1_1) may indicate a corresponding TCI state for a TRP 405 corresponding to the DCI. The TCI field of a DCI indicates the corresponding TCI state (e.g., the TCI field of the first DCI indicates the first TCI state and the TCI field of the second DCI indicates the second TCI state).

As indicated above, FIG. 4 is provided as an example. Other examples may differ from what is described with respect to FIG. 4.

Figure 5:
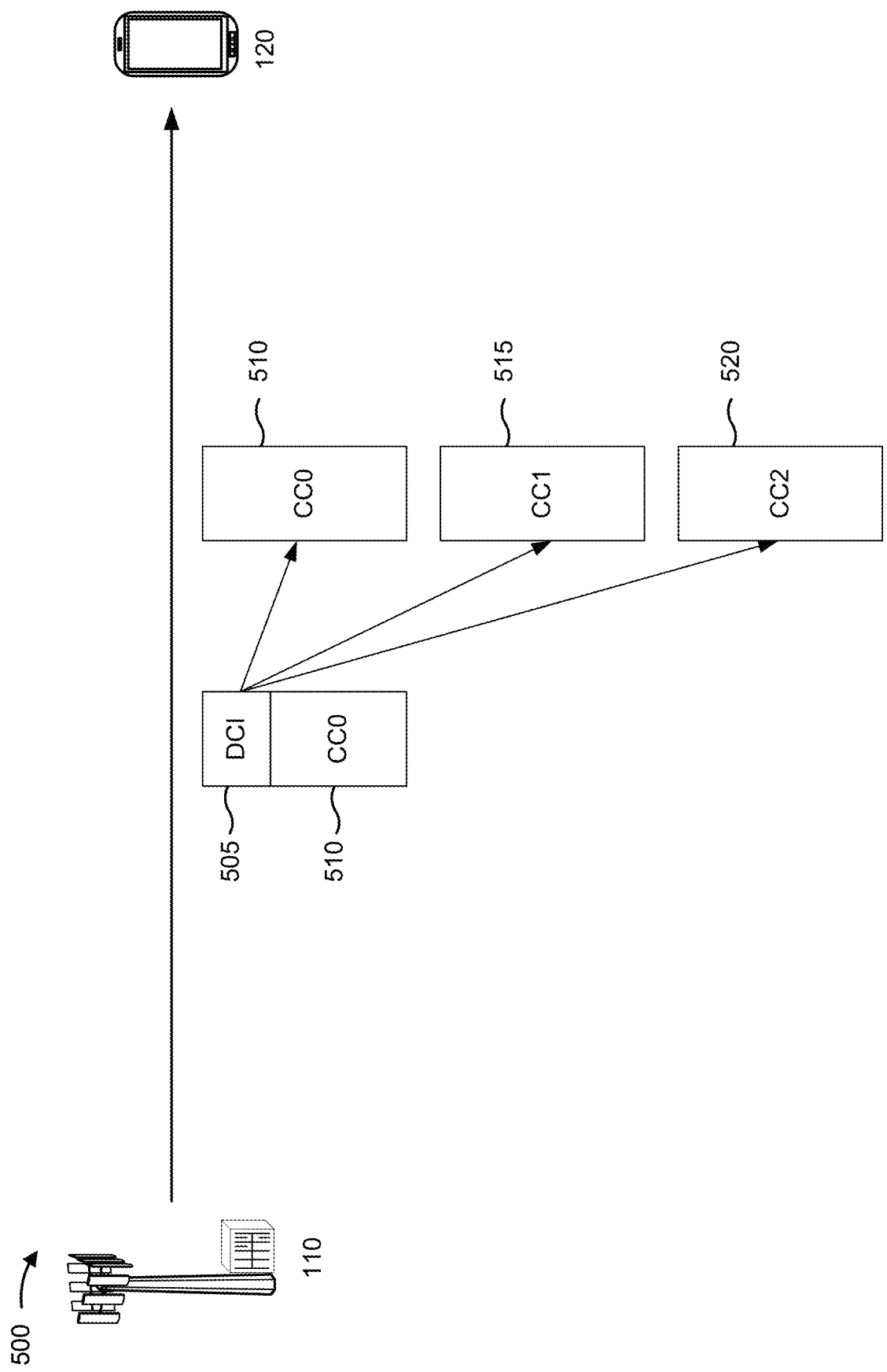
FIG. 5 is a diagram illustrating an example of downlink control information (DCI) that schedules multiple cells, in accordance with the present disclosure.

FIG. 5 is a diagram illustrating an example 500 of DCI that schedules multiple cells (e.g., multiple TRPs), in accordance with the present disclosure. As shown in FIG. 5, a base station 110 and a UE 120 may communicate with one another.

The base station 110 may transmit, to the UE 120, DCI 505 that schedules multiple communications for the UE 120. The multiple communications may be scheduled for at least two different cells (e.g., two different TRPs). In some cases, a cell may be referred to as a component carrier (CC). In some cases, DCI that schedules a communication for a cell via which the DCI is transmitted may be referred to as self-carrier (or self-cell) scheduling DCI. In some cases, DCI that schedules a communication for a cell via which the DCI is transmitted may be referred to as cross-carrier (or cross-cell) scheduling DCI. In some aspects, the DCI 505 may be cross-carrier scheduling DCI and may or may not be self-carrier scheduling DCI. In some aspects, the DCI 505 that carries communications in at least two cells may be referred to as combination DCI.

In example 500, the DCI 505 schedules a communication for a first cell 510 that carries the DCI 505 (shown as CC0), schedules a communication for a second cell 515 that does not carry the DCI 505 (shown as CC1), and schedules a communication for a third cell 520 that does not carry the DCI 505 (shown as CC2). In some aspects, the DCI 505 may schedule communications on a different number of cells than shown in FIG. 5 (e.g., two cells, four cells, five cells, and so on). The number of cells may be greater than or equal to two.

A communication scheduled by the DCI 505 may include a data communication, such as a PDSCH communication or a physical uplink shared channel (PUSCH) communication. For a data communication, the DCI 505 may schedule a single transport block (TB) across multiple cells or may separately schedule multiple TBs in the multiple cells. Additionally, or alternatively, a communication scheduled by the DCI 505 may include a reference signal, such as a channel state information reference signal (CSI-RS) or an SRS. For a reference signal, the DCI 505 may trigger a single resource for reference signal transmission across multiple cells or may separately schedule multiple resources for reference signal transmission in the multiple cells. In some cases, scheduling information in the DCI 505 may be indicated once and reused for multiple communications (e.g., on different cells), such as a modulation and coding scheme (MCS), a resource to be used for acknowledgement (ACK) or negative acknowledgement (NACK) of a communication scheduled by the DCI 505, and/or a resource allocation for a scheduled communication, to conserve signaling overhead.

As indicated above, FIG. 5 is provided as an example. Other examples may differ from what is described with respect to FIG. 5.

Figure 6:
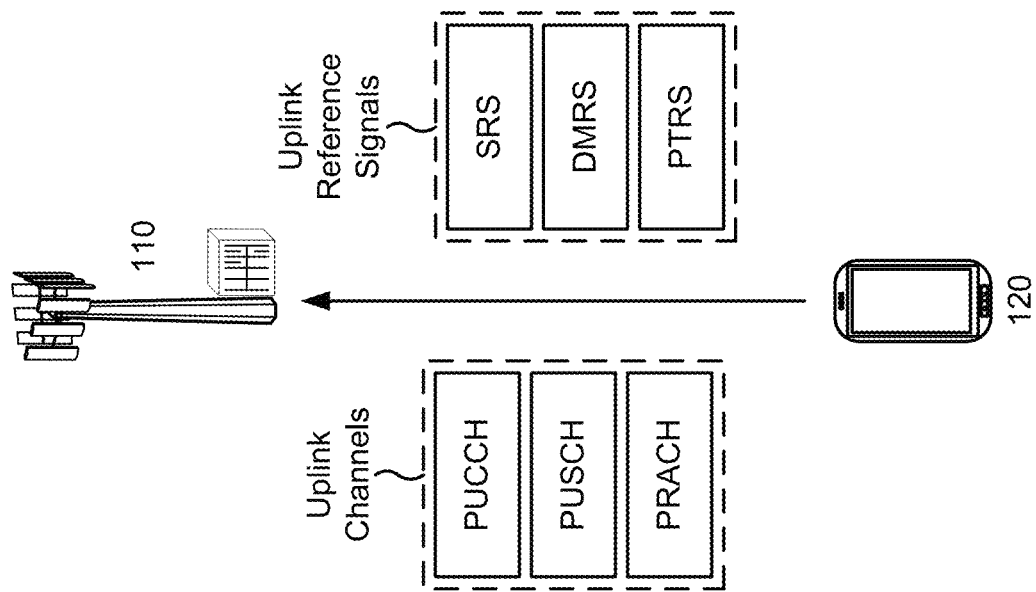
FIG. 6 is a diagram illustrating an example of physical channels and reference signals in a wireless network, in accordance with the present disclosure.
Figure 6:
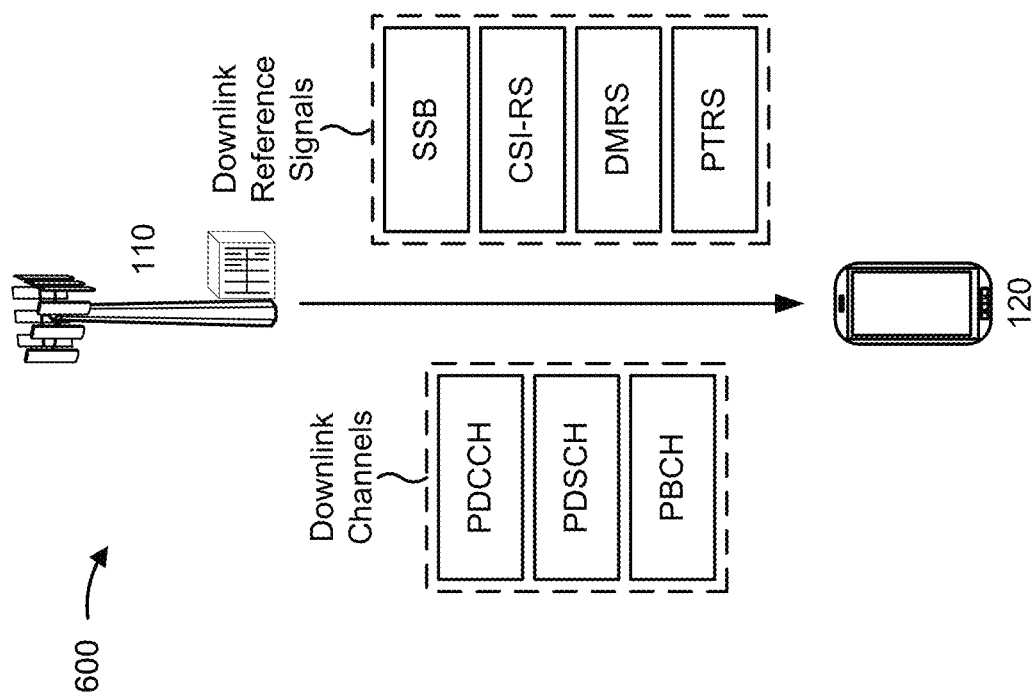

FIG. 6 is a diagram illustrating an example 600 of physical channels and reference signals in a wireless network, in accordance with the present disclosure. As shown in FIG. 6, downlink channels and downlink reference signals may carry information from a base station 110 to a UE 120, and uplink channels and uplink reference signals may carry information from a UE 120 to a base station 110.

As shown, a downlink channel may include a physical downlink control channel (PDCCH) that carries DCI, a physical downlink shared channel (PDSCH) that carries downlink data, or a physical broadcast channel (PBCH) that carries system information, among other examples. In some aspects, PDSCH communications may be scheduled by PDCCH communications. As further shown, an uplink channel may include a physical uplink control channel (PUCCH) that carries uplink control information (UCI), a physical uplink shared channel (PUSCH) that carries uplink data, or a physical random access channel (PRACH) used for initial network access, among other examples. In some aspects, the UE 120 may transmit acknowledgement (ACK) or negative acknowledgement (NACK) feedback (e.g., ACK/NACK feedback or ACK/NACK information) in UCI on the PUCCH and/or the PUSCH.

As further shown, a downlink reference signal may include a synchronization signal block (SSB), a channel state information (CSI) reference signal (CSI-RS), a demodulation reference signal (DMRS), a positioning reference signal (PRS), or a phase tracking reference signal (PTRS), among other examples. As also shown, an uplink reference signal may include an SRS, a DMRS, or a PTRS, among other examples.

An SSB may carry information used for initial network acquisition and synchronization, such as a primary synchronization signal (PSS), a secondary synchronization signal (SSS), a PBCH, and a PBCH DMRS. An SSB is sometimes referred to as a synchronization signal/PBCH (SS/PBCH) block. In some aspects, the base station 110 may transmit multiple SSBs on multiple corresponding beams, and the SSBs may be used for beam selection.

A CSI-RS may carry information used for downlink channel estimation (e.g., downlink CSI acquisition), which may be used for scheduling, link adaptation, or beam management, among other examples. The base station 110 may configure a set of CSI-RSs for the UE 120, and the UE 120 may measure the configured set of CSI-RSs. Based at least in part on the measurements, the UE 120 may perform channel estimation and may report channel estimation parameters to the base station 110 (e.g., in a CSI report), such as a channel quality indicator (CQI), a precoding matrix indicator (PMI), a CSI-RS resource indicator (CRI), a layer indicator (LI), a rank indicator (RI), or a reference signal received power (RSRP), among other examples. The base station 110 may use the CSI report to select transmission parameters for downlink communications to the UE 120, such as a number of transmission layers (e.g., a rank), a precoding matrix (e.g., a precoder), a modulation and coding scheme (MCS), or a refined downlink beam (e.g., using a beam refinement procedure or a beam management procedure), among other examples.

A DMRS may carry information used to estimate a radio channel for demodulation of an associated physical channel (e.g., PDCCH, PDSCH, PBCH, PUCCH, or PUSCH). The design and mapping of a DMRS may be specific to a physical channel for which the DMRS is used for estimation. DMRSs are UE-specific, can be beamformed, can be confined in a scheduled resource (e.g., rather than transmitted on a wideband), and can be transmitted only when necessary. As shown, DMRSs are used for both downlink communications and uplink communications.

A PTRS may carry information used to compensate for oscillator phase noise. Typically, the phase noise increases as the oscillator carrier frequency increases. Thus, PTRS can be utilized at high carrier frequencies, such as millimeter wave frequencies, to mitigate phase noise. The PTRS may be used to track the phase of the local oscillator and to enable suppression of phase noise and common phase error (CPE). As shown, PTRSs are used for both downlink communications (e.g., on the PDSCH) and uplink communications (e.g., on the PUSCH).

A PRS may carry information used to enable timing or ranging measurements of the UE 120 based on signals transmitted by the base station 110 to improve observed time difference of arrival (OTDOA) positioning performance. For example, a PRS may be a pseudo-random Quadrature Phase Shift Keying (QPSK) sequence mapped in diagonal patterns with shifts in frequency and time to avoid collision with cell-specific reference signals and control channels (e.g., a PDCCH). In general, a PRS may be designed to improve detectability by the UE 120, which may need to detect downlink signals from multiple neighboring base stations in order to perform OTDOA-based positioning. Accordingly, the UE 120 may receive a PRS from multiple cells (e.g., a reference cell and one or more neighbor cells), and may report a reference signal time difference (RSTD) based on OTDOA measurements associated with the PRSs received from the multiple cells. In some aspects, the base station 110 may then calculate a position of the UE 120 based on the RSTD measurements reported by the UE 120.

An SRS may carry information used for uplink channel estimation, which may be used for scheduling, link adaptation, precoder selection, or beam management, among other examples. The base station 110 may configure one or more SRS resource sets for the UE 120, and the UE 120 may transmit SRSs on the configured SRS resource sets. An SRS resource set may have a configured usage, such as uplink CSI acquisition, downlink CSI acquisition for reciprocity-based operations, uplink beam management, among other examples. The base station 110 may measure the SRSs, may perform channel estimation based at least in part on the measurements, and may use the SRS measurements to configure communications with the UE 120.

As indicated above, FIG. 6 is provided as an example. Other examples may differ from what is described with regard to FIG. 6.

Figure 7:
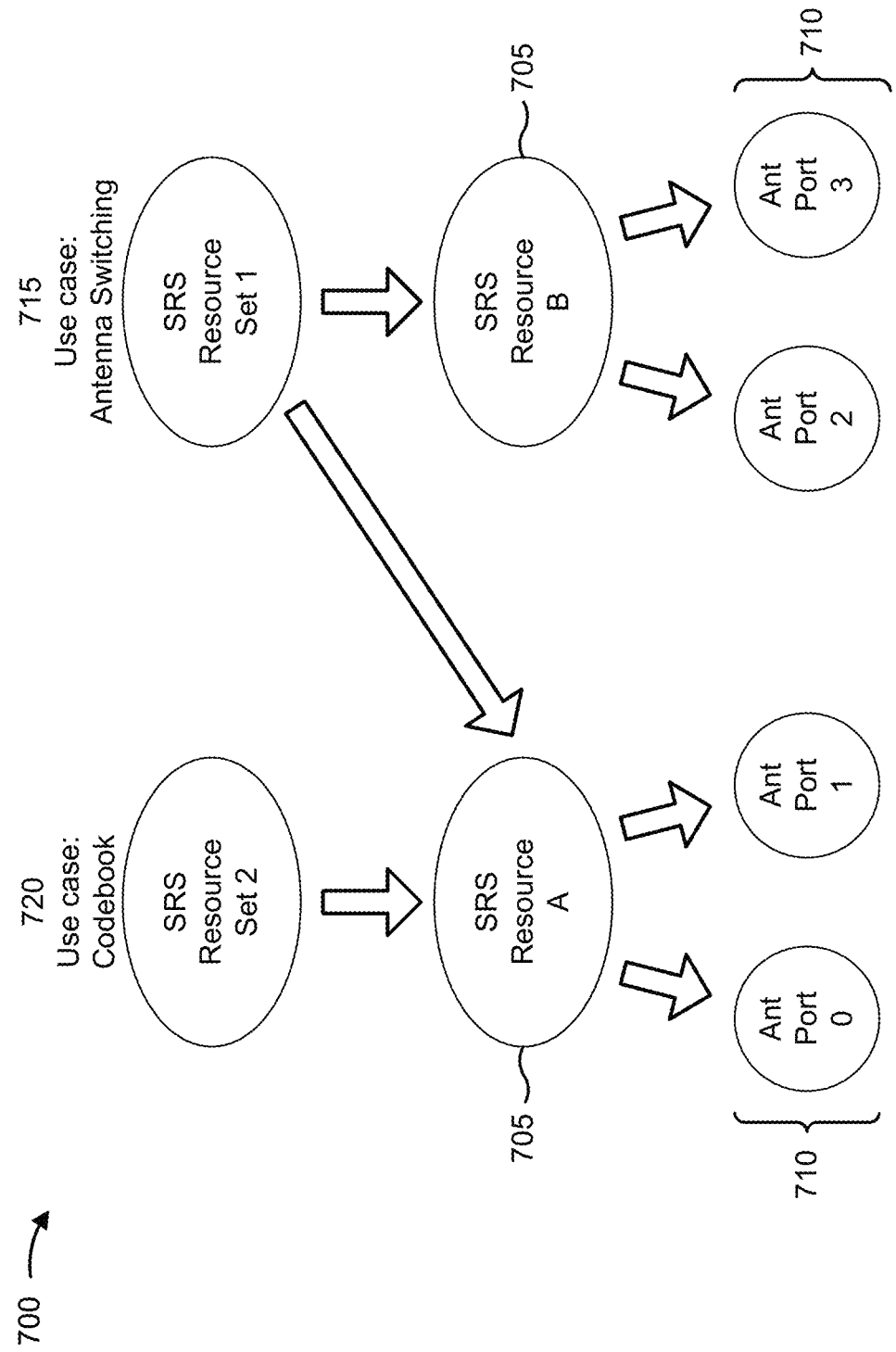
FIG. 7 is a diagram illustrating an example of sounding reference signal (SRS) resource sets, in accordance with the present disclosure.

FIG. 7 is a diagram illustrating an example 700 of SRS resource sets, in accordance with the present disclosure.

A base station 110 may configure a UE 120 with one or more SRS resource sets to allocate resources for SRS transmissions by the UE 120. For example, a configuration for SRS resource sets may be indicated in a radio resource control (RRC) message (e.g., an RRC configuration message or an RRC reconfiguration message). As shown by reference number 705, an SRS resource set may include one or more resources (e.g., shown as SRS resources), which may include time resources and/or frequency resources (e.g., a slot, a symbol, a resource block, and/or a periodicity for the time resources). As shown by reference number 710, an SRS resource may include one or more antenna ports on which an SRS is to be transmitted (e.g., in a time-frequency resource). Thus, a configuration for an SRS resource set may indicate one or more time-frequency resources in which an SRS is to be transmitted and may indicate one or more antenna ports on which the SRS is to be transmitted in those time-frequency resources. In some aspects, the configuration for an SRS resource set may indicate a use case (e.g., in an SRS-SetUse information element) for the SRS resource set. For example, an SRS resource set may have a use case of antenna switching, codebook, non-codebook, or beam management.

An antenna switching SRS resource set may be used to indicate downlink CSI with reciprocity between an uplink and downlink channel. For example, when there is reciprocity between an uplink channel and a downlink channel, a base station 110 may use an antenna switching SRS (e.g., an SRS transmitted using a resource of an antenna switching SRS resource set) to acquire downlink CSI (e.g., to determine a downlink precoder to be used to communicate with the UE 120).

A codebook SRS resource set may be used to indicate uplink CSI when a base station 110 indicates an uplink precoder to the UE 120. For example, when the base station 110 is configured to indicate an uplink precoder to the UE 120 (e.g., using a precoder codebook), the base station 110 may use a codebook SRS (e.g., an SRS transmitted using a resource of a codebook SRS resource set) to acquire uplink CSI (e.g., to determine an uplink precoder to be indicated to the UE 120 and used by the UE 120 to communicate with the base station 110). In some aspects, virtual ports (e.g., a combination of two or more antenna ports) with a maximum transmit power may be supported at least for a codebook SRS.

A non-codebook SRS resource set may be used to indicate uplink CSI when the UE 120 selects an uplink precoder (e.g., instead of the base station 110 indicated an uplink precoder to be used by the UE 120). For example, when the UE 120 is configured to select an uplink precoder, the base station 110 may use a non-codebook SRS (e.g., an SRS transmitted using a resource of a non-codebook SRS resource set) to acquire uplink CSI. In this case, the non-codebook SRS may be precoded using a precoder selected by the UE 120 (e.g., which may be indicated to the base station 110).

A beam management SRS resource set may be used for indicating CSI for millimeter wave communications.

An SRS resource can be configured as periodic, semi-persistent (sometimes referred to as semi-persistent scheduling (SPS)), or aperiodic. A periodic SRS resource may be configured via a configuration message that indicates a periodicity of the SRS resource (e.g., a slot-level periodicity, where the SRS resources occurs every Y slots) and a slot offset. In some cases, a periodic SRS resource may always be activated, and may not be dynamically activated or deactivated. A semi-persistent SRS resource may also be configured via a configuration message that indicates a periodicity and a slot offset for the semi-persistent SRS resource, and may be dynamically activated and deactivated (e.g., using DCI or a medium access control (MAC) control element (CE) (MAC-CE)). An aperiodic SRS resource may be triggered dynamically, such as via DCI (e.g., UE-specific DCI or group common DCI) or a MAC-CE.

In some aspects, the UE 120 may be configured with a mapping between SRS ports (e.g., antenna ports) and corresponding SRS resources. The UE 120 may transmit an SRS on a particular SRS resource using an SRS port indicated in the configuration. In some aspects, an SRS resource may span M adjacent symbols within a slot (e.g., where M equals 1, 2, or 4). The UE 120 may be configured with X SRS ports (e.g., where X≤4). In some aspects, each of the X SRS ports may mapped to a corresponding symbol of the SRS resource and used for transmission of an SRS in that symbol.

As shown in FIG. 7, in some aspects, different SRS resource sets indicated to the UE 120 (e.g., having different use cases) may overlap (e.g., in time and/or in frequency, such as in the same slot). For example, as shown by reference number 715, a first SRS resource set (e.g., shown as SRS Resource Set 1) is shown as having an antenna switching use case. As shown, this example antenna switching SRS resource set includes a first SRS resource (shown as SRS Resource A) and a second SRS resource (shown as SRS Resource B). Thus, antenna switching SRS may be transmitted in SRS Resource A (e.g., a first time-frequency resource) using antenna port 0 and antenna port 1 and may be transmitted in SRS Resource B (e.g., a second time-frequency resource) using antenna port 2 and antenna port 3.

As shown by reference number 720, a second SRS resource set (e.g., shown as SRS Resource Set 2) may be a codebook use case. As shown, this example codebook SRS resource set includes only the first SRS resource (shown as SRS Resource A). Thus, codebook SRSs may be transmitted in SRS Resource A (e.g., the first time-frequency resource) using antenna port 0 and antenna port 1. In this case, the UE 120 may not transmit codebook SRSs in SRS Resource B (e.g., the second time-frequency resource) using antenna port 2 and antenna port 3.

As indicated above, a base station may schedule or configure uplink transmissions for a UE on an uplink. In some cases, the base station may configure the UE to perform a codebook-based PUSCH transmission, which may be a PUSCH transmission that is configured to be performed in an SRS resource set with a usage of "codebook" configured for the UE. The SRS resource set may include N SRS resources (e.g., where N=1, 2, 3, or 4), and the base station may configure the quantity of SRS ports and spatial relation information for each of the SRS resources on a per-SRS resource basis.

The base station may indicate, to the UE, an SRS resource for a PUSCH transmission by indicating the SRS resource in an SRS resource indicator (SRI) field in a downlink communication (e.g., a DCI communication with a format 0_1 or format 0_2, which may be uplink scheduling DCI) that schedules the PUSCH transmission. The UE may use the same spatial domain transmission filter for the PUSCH transmission as the indicated SRS resource, and may use the quantity of SRS ports of the indicated SRS resource as the quantity of antenna ports for the PUSCH transmission.

In some cases, the downlink communication may further indicate a transmitted precoding matrix indicator (TPMI) and a quantity of layers for the PUSCH transmission. For example, if the downlink communication is a DCI communication, the DCI communication may include a Precoding Information and Number of Layers field that indicates the TPMI and the quantity of layers. The Precoding Information and Number of Layers field may include a codepoint (e.g., a plurality of bits indicating or representing a particular value) that identifies an index associated with a row or column in a table or another type of data structure. The row or column may indicate the quantity of layers and the TPMI that are associated with the index.

In some cases, a base station may configure a UE to transmit a plurality of repetitions of the same PUSCH transmission (e.g., a plurality of repetitions of the same PUSCH transport block), where each repetition may be directed to a TRP among a plurality of TRPs in a multi-TRP configuration, an antenna panel among a plurality of antenna panels in a multi-panel configuration, or an antenna among a plurality of antennas in a multi-antenna configuration. Thus, if an access link between the UE and a TRP (or antenna panel or antenna) is blocked such that a repetition transmitted to the TRP is not received, another repetition transmitted to another TRP may be received such that the PUSCH transmission can be decoded.

In some cases, the UE may be configured to transmit repetitions of a PUSCH transmission in different time-domain resources (e.g., slots/mini-slots). Each time-domain resource configured for a repetition of the PUSCH transmission may be referred to as a PUSCH transmission occasion. This may enable the UE to transmit the PUSCH repetitions with different SRS resource sets (e.g., for different TRPs). However, DCI format 0_2 has a decreased number of bits, relative to DCI format 0_1, for identifying SRS resource sets to be used by the UE for scheduling PUSCH repetitions. Thus, when the UE is configured for multi-TRP PUSCH repetitions scheduled via one or both DCI formats (e.g., resulting in 3 or 4 different SRS resource sets), the complexity for the UE may increase when determining which SRS resources and/or SRS resource sets are to be used for PUSCH repetitions, as more options for selecting SRS resource sets and ordering PUSCH repetitions are available.

As indicated above, FIG. 7 is provided as an example. Other examples may differ from what is described with regard to FIG. 7.

Some techniques and apparatuses described herein enable a UE to be separately configured to schedule multi-TRP transmission for different DCI formats without increasing UE complexity involved in determining which SRS resources and/or SRS resource sets are to be used for PUSCH repetitions scheduled by the different DCI formats. For example, the UE may be configured with a first set of SRS resource sets for a first DCI format (e.g., DCI format 0_1) and a second set of SRS resource sets for a second DCI format (e.g., DCI format 0_2). For example, the SRS resource sets of the second set (e.g., for DCI format 0_2) may include the first N SRS resources of the corresponding SRS resource sets of the first set (e.g., for DCI format 0_1, where N is equal to a number of SRS resources configured for a corresponding SRS resource set), and an order in which uplink communications are transmitted may be determined based on a lowest SRS resource set identifier being transmitted first. When DCI scheduling uplink communications (e.g., PUSCH repetition(s)) is received, the UE may select the SRS resources used for the uplink communications based on the format of the DCI. This may enable the UE to schedule PUSCH repetitions for multiple DCI formats and for multiple TRPs using the same rule (e.g., lowest SRS resource set identifier first) for each DCI format. This may reduce the complexity for the UE handling DCI scheduling uplink communications, conserving resources of the UE (e.g., processing resources, power resources, and/or the like) and enabling efficient multi-TRP network communications, which may reduce wireless network congestion and lead to improved communications quality on the wireless network.

Figure 8:
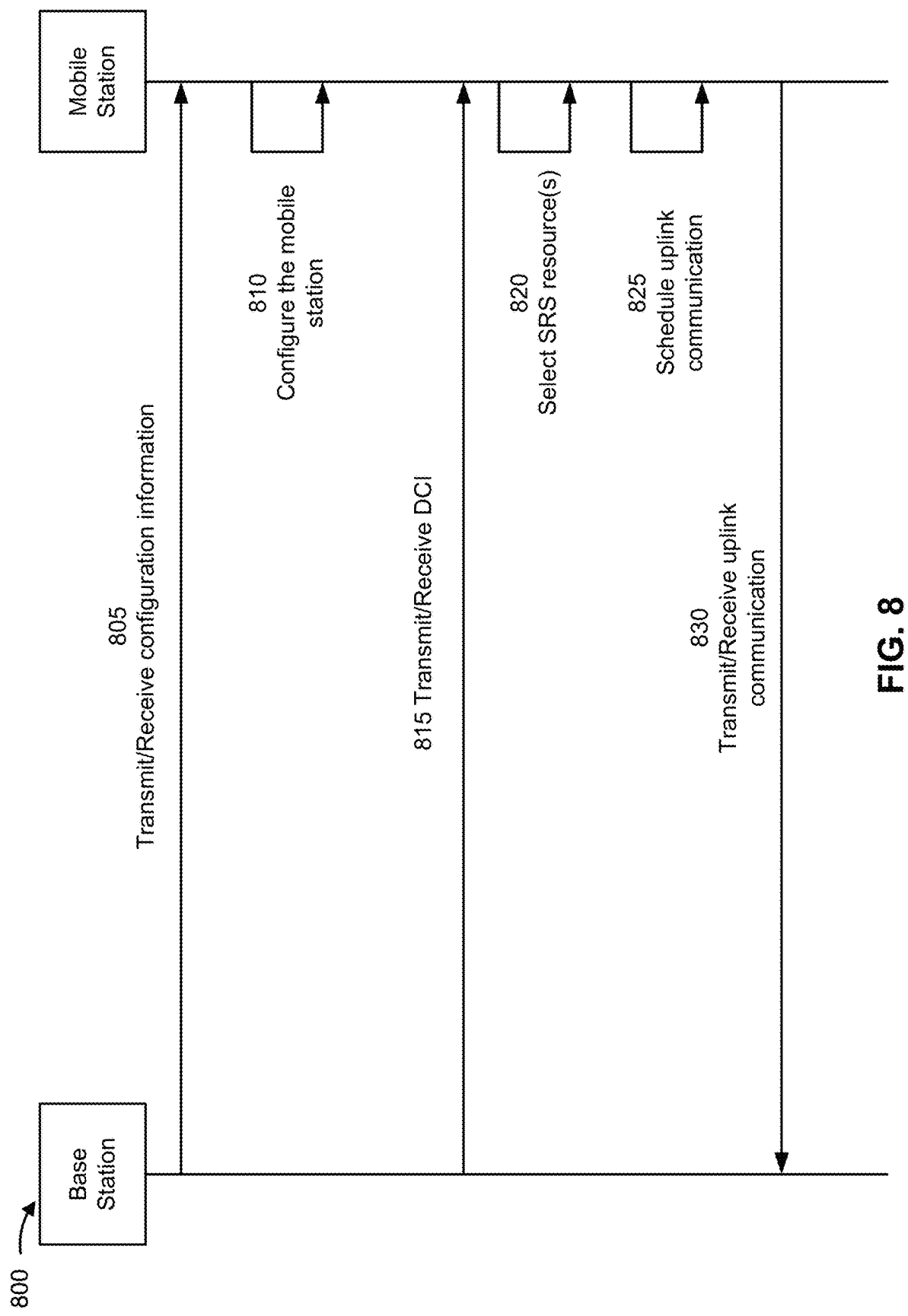
FIG. 8 is a diagram illustrating an example associated with communications associated with different SRS resource sets, in accordance with the present disclosure.

FIG. 8 is a diagram illustrating an example 800 of communications associated with different sounding reference signal resource sets, in accordance with the present disclosure. As shown in FIG. 8, a mobile station (e.g., UE 120) may communicate (e.g., transmit an uplink transmission and/or receive a downlink transmission) with a base station (e.g., base station 110). The mobile station and the base station may be part of a wireless network (e.g., wireless network 100).

As shown by reference number 805, the base station may transmit, and the mobile station may receive, configuration information. In some aspects, the mobile station may receive configuration information from another device (e.g., from another base station or another mobile station). In some aspects, the mobile station may receive the configuration information via RRC signaling and/or medium access control (MAC) signaling (e.g., MAC control elements (MAC CEs)). In some aspects, the configuration information may include an indication of one or more configuration parameters (e.g., already known to the mobile station) for selection by the mobile station and/or explicit configuration information for the mobile station to use to configure the mobile station.

In some aspects, the configuration information may indicate that the mobile station is to transmit uplink communications using different SRS resource sets based on a format of the DCI used to schedule the uplink communications and SRS resource sets configured separately for different DCI formats. For example, the configuration information may indicate two sets of SRS resource sets to be associated with two different DCI formats, such as a first set of SRS resource sets for DCI format 0_1 and a second set of SRS resource sets for DCI format 0_2. At least one of the sets includes at least two SRS resource sets (e.g., for multi-TRP uplink communications, such as multi-TRP PUSCH repetitions).

In some aspects, the configuration information may indicate that, in each set of SRS resource sets (e.g., configured separately for the different DCI formats) the SRS resource set with the lowest SRS resource set identifier is treated as the first SRS resource set for uplink communications transmitted by the mobile station. In some aspects, an SRS resource set of the second set may include SRS resources that match other SRS resources of another SRS resource set of the first set. For example, the first SRS resource set for the second set (e.g., for DCI format 0_2) may include the first N SRS resources of the first SRS resource set for the first set (e.g., for DCI format 0_1). As another example, the second SRS resource set for the second set (e.g., for DCI format 0_2) may include the first N SRS resources of the second SRS resource set for the first set (e.g., for DCI format 0_1).

In some aspects, the first set of SRS resource sets includes two SRS resource sets, and the second set of SRS resource sets includes two SRS resource sets. In this case, the mobile station may be configured for multi-TRP uplink communications for both the first and the second DCI formats (e.g., 0_1 and 0_2, respectively). In some aspects, either the first set or the second set may include two SRS resource sets, and the other set may include only one SRS resource set. In this case, the mobile station may be configured for multi-TRP uplink communications for only the DCI format associated with two SRS resource sets and configured for single TRP uplink communications for the other DCI format associated with one SRS resource set.

In some aspects, the configuration information indicates that the first DCI format is associated with a first dynamic switching field, and the second DCI format is associated with a second dynamic switching field. The dynamic switching field may be a two-bit field used to indicate to which TRP(s) the mobile station is to transmit uplink communications (e.g., PUSCH repetitions). For example, in a situation where the mobile station is configured with multiple SRS resource sets for a DCI format, the dynamic switching bits may indicate that the mobile station is to transmit PUSCH repetitions to only a first TRP (e.g., mapped to 00), only a second TRP (e.g., mapped to 01), to both TRPs where repetitions for the first TRP precede repetitions for the second TRP (e.g., mapped to 10), or to both TRPs where repetitions for the second TRP precede repetitions for the first TRP (e.g., mapped to 11).

In some aspects, the configuration information indicates at least one rule specifying an order in which PUSCH communications are to be transmitted, the order being based at least in part on a received DCI format. In some cases, a dynamic switching field may not be configured for a DCI format, but two SRS resource sets may be configured for the DCI format. Without dynamic switching to indicate which SRS resource sets are to be used first for PUSCH repetitions, the at least one rule may resolve which SRS resource set(s) is/are to be used. For example, PUSCH repetitions scheduled with a DCI format may be associated with the SRS resource set with a lowest SRS resource set identifier among the two SRS resource sets configured for the DCI format (e.g., codepoint 00 of the dynamic switching field is assumed). As another example, PUSCH repetitions scheduled with a DCI format may be associated with both SRS resource sets, and the SRS resource set with a lowest SRS resource set identifier among the two SRS resource sets configured for the DCI format is first (e.g., codepoint 10 of the dynamic switching field is assumed).

In some aspects, the order specified by the rule may be based at least in part on the presence of a dynamic switching field in the received DCI. For example, in a situation where two SRS resource sets are configured for a DCI format, the dynamic switching field may be configured for the DCI format (e.g., as described herein). In a situation where only one SRS resource set is configured for the DCI format, the dynamic switching field is not configured for the DCI format (e.g., there is no need to switch between TRPs).

In some aspects, the configuration information may indicate that the base station may transmit, to the mobile station, DCI with one of two different formats for scheduling uplink transmissions (e.g., format 0_1 and 0_2 for scheduling PUSCH repetitions). In some aspects, the SRS resource sets described herein may have a usage value indicating the SRS resource sets are codebook or non-codebook SRS resource sets.

As shown by reference number 810, the mobile station may configure the mobile station for communicating with the base station. In some aspects, the mobile station may configure the mobile station based at least in part on the configuration information. In some aspects, the mobile station may be configured to perform one or more operations described herein. For example, the mobile station may be configured to use a first set or a second set of SRS resource sets for transmission of at least one uplink communication based at least in part on a format of received DCI being a first DCI format or a second DCI format.

As shown by reference number 815, the base station may transmit, and the mobile station may receive, DCI. For example, the DCI may be transmitted via PDCCH and be in one of two DCI formats (e.g., DCI format 0_1 or 0_2) to schedule uplink communications from the mobile station. In some aspects, the DCI may include a dynamic switching field indicating an order in which PUSCH repetitions are to be transmitted. For example, the dynamic switching field may include two bits indicating which TRP, of multiple TRPs, should be the recipient of the first PUSCH repetition transmitted by the mobile station.

As shown by reference number 820, the mobile station may select at least one SRS resource for at least one uplink communication. The at least one SRS resource may be selected based at least in part on the format of the received DCI. For example, as described herein, when the mobile station receives DCI in the first DCI format (e.g., DCI format 0_1), the mobile station may select the at least one SRS resource from the SRS resource set(s) configured for the first DCI format. When the mobile station receives DCI in the second DCI format (e.g., DCI format 0_2), the mobile station may select the at least one SRS resource from the SRS resource set(s) configured for the second DCI format.

As shown by reference number 825, the mobile station may schedule PUSCH repetitions. In some aspects, the PUSCH repetitions may be scheduled to be transmitted using at least two SRS resource sets. For example, the received DCI scheduling the PUSCH repetitions may be in a DCI format for which multiple SRS resource sets are configured (e.g., multi-TRP is configured). In some aspects, when a dynamic switching field is configured for the DCI and present, the PUSCH repetitions may be scheduled based at least in part on a value of the dynamic switching field. For example, as described herein, the value of the dynamic switching field may indicate the order in which the mobile station is to schedule PUSCH repetitions between multiple TRPs. In some aspects, the mobile station may use pre-configured rules to schedule the PUSCH repetitions, as described herein. For example, the mobile station may schedule PUSCH repetitions such that the SRS resource set with a lowest SRS resource set identifier is associated with a first PUSCH repetition for a first TRP, and the other SRS resource set is associated with a second PUSCH repetition for a second TRP.

In some aspects, as described herein, a first SRS resource set (e.g., based on SRS resource set identifier) configured for the second DCI format (e.g., DCI format 0_2) may include the first N SRS resources of either the first SRS resource set or the second SRS resource set configured for the first DCI format (e.g., DCI format 0_1). Similarly, the second SRS resource set configured for the second DCI format may include the first N SRS resources of the of either the first SRS resource set or the second SRS resource set configured for the first DCI format. For example, in a situation where two SRS resource sets are configured for both DCI format 0_1 and DCI format 0_2, the first SRS resource set for DCI format 0_2 may be configured to include the first N resources of the first SRS resource set configured for DCI format 0_1, and the second SRS resource set for DCI format 0_2 may be configured to include the first N resources of the second SRS resource set configured for DCI format 0_1. In a situation where one SRS resource set is configured for DCI format 0_1 and two SRS resource sets are configured for DCI format 0_2, at least one of the first SRS resource set or the second SRS resource set for DCI format 0_2 may be configured to include the first N resources of the SRS resource set configured for DCI format 0_1. In a situation where two SRS resource sets are configured for DCI format 0_1 and one SRS resource set is configured for DCI format 0_2, the SRS resource set for DCI format 0_2 may be configured to include the first N resources of either the first SRS resource set or the second SRS resource set configured for DCI format 0_1. As described herein, using the same SRS resources in the second DCI format may reduce complexity for the mobile station when transmitting the PUSCH repetitions by reducing the number of different parameters associated with different SRS resources.

As shown by reference number 830, the mobile station may transmit, and the base station may receive, at least one uplink communication. For example, the at least one uplink communication may be transmitted using at least one SRS resource of at least one SRS resource set configured for the first DCI format or the second DCI format (e.g., based at least in part on the configuration information). In some aspects, the uplink communication may include one or more PUSCH repetitions, as described herein. In some aspects, one set of PUSCH repetitions may be transmitted to one base station (e.g., a TRP located at the base station) while another set of PUSCH repetitions may be transmitted to another base station (e.g., another TRP located at the same base station or a different base station). The order in which the PUSCH repetitions are transmitted is based on the manner in which the PUSCH repetitions are scheduled, as described herein.

As indicated above, FIG. 8 is provided as an example. Other examples may differ from what is described with regard to FIG. 8.

Figure 9:
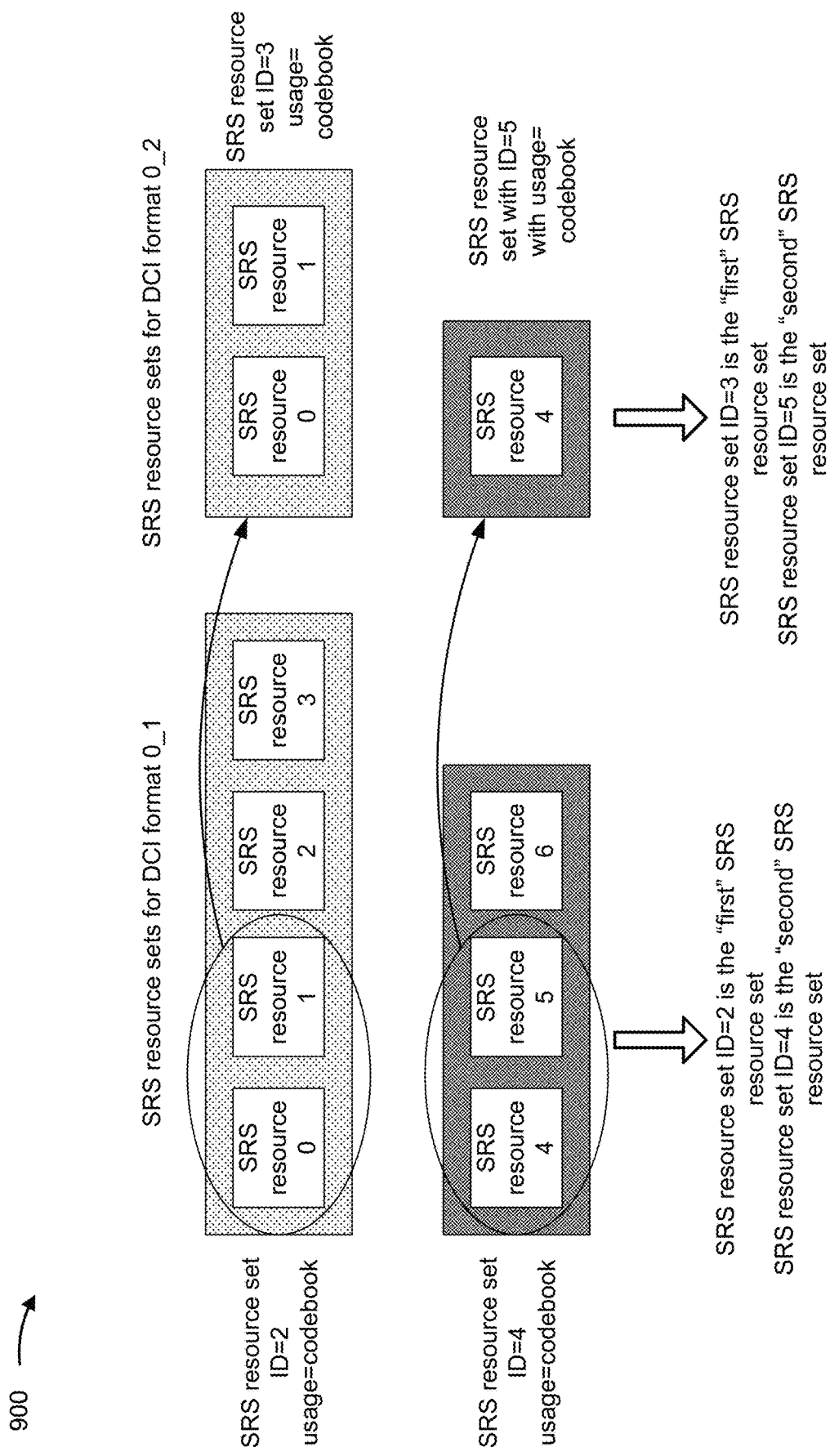
FIG. 9 is a diagram illustrating an example associated with uplink communications configured for different SRS resource sets, in accordance with the present disclosure.

FIG. 9 is a diagram illustrating an example 900 associated with uplink communications configured for different SRS resource sets, in accordance with the present disclosure. As shown in FIG. 9, a configuration of two SRS resource sets for DCI format 0_1 (e.g., on the left side of example 900) and two SRS resource sets for DCI format 0_2 (e.g., on the left side of example 900) is shown. The example 900 depicts a situation in which SRS resource set usage is set to codebook.

For DCI format 0_1, the first SRS resource set has an SRS resource identifier of 2 and includes four SRS resources (e.g., labeled SRS resources 0-3). The second SRS resource set has an SRS resource identifier of 4 and includes three SRS resources (e.g., labeled SRS resource 4-6). For DCI format 0_2, the first SRS resource set has an SRS resource identifier of 3 and includes two SRS resources (e.g., the first N SRS resources of the first SRS resource set for DCI format 0_1, labeled SRS resources 0-1). The second SRS resource set has an SRS resource identifier of 5 and includes one SRS resource (e.g., the first N SRS resources of the second SRS resource set for DCI format 0_1, labeled SRS resource 4).

In example 900, the first and second SRS resource sets, for the purpose of ordering multi-TRP PUSCH transmissions, are SRS resource sets 2 and 4, respectively, for DCI format 0_1, and SRS resource sets 3 and 5, respectively, for DCI format 0_2. While a dynamic switching field of a DCI may indicate a different order in which SRS resource sets should be transmitted in PUSCH repetitions, as described herein, the first and second SRS resource sets of each DCI format may be based on the SRS resource identifiers (e.g., lowest SRS resource set identifier being first).

As indicated above, FIG. 9 is provided as an example. Other examples may differ from what is described with respect to FIG. 9.

Figure 10:
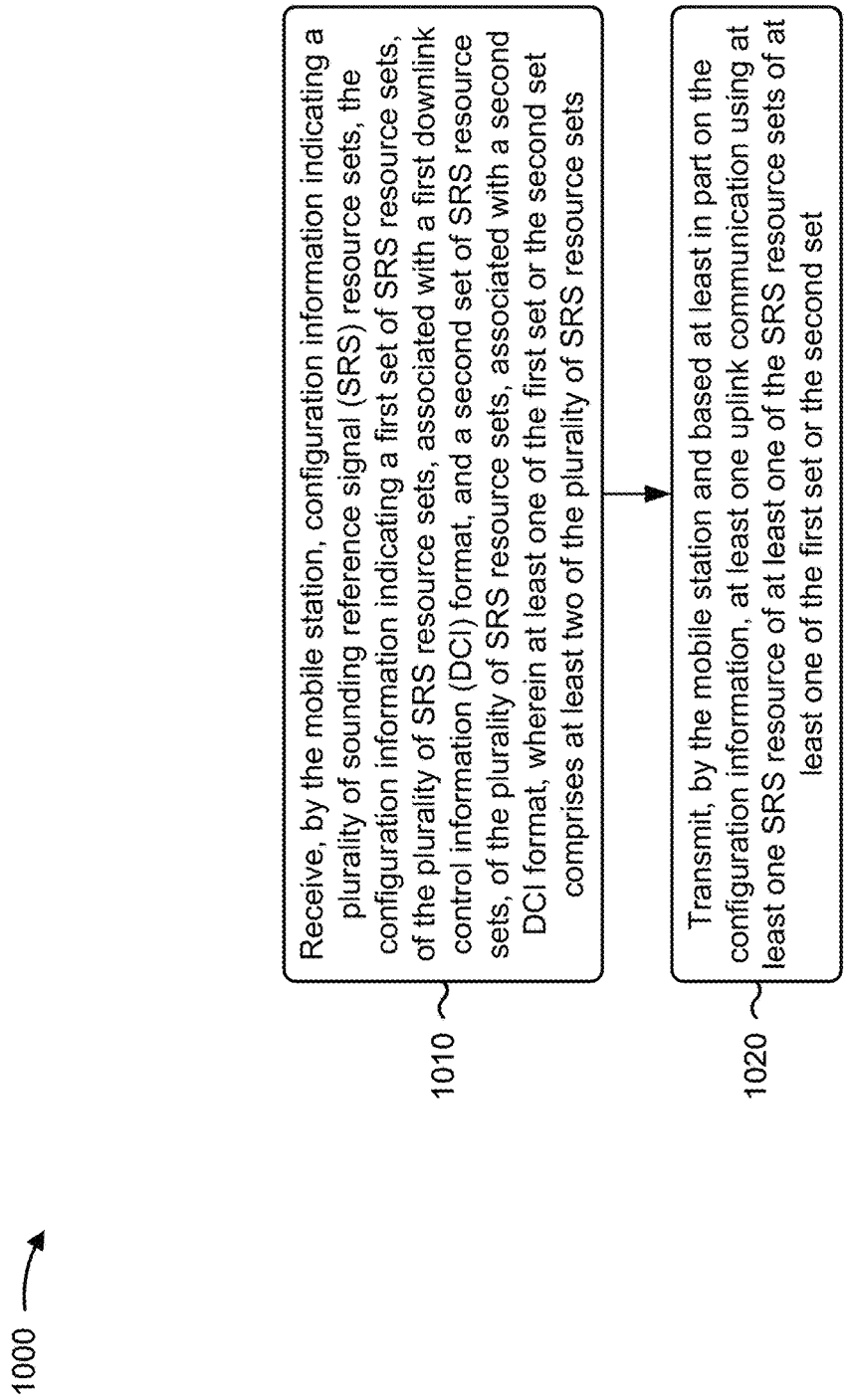
FIGS. 10 and 11 are diagrams illustrating example processes associated with communications associated with different SRS resource sets, in accordance with the present disclosure.

FIG. 10 is a diagram illustrating an example process 1000 performed, for example, by a mobile station, in accordance with the present disclosure. Example process 1000 is an example where the mobile station (e.g., UE 120) performs operations associated with communications associated with different sounding reference signal resource sets.

As shown in FIG. 10, in some aspects, process 1000 may include receiving configuration information indicating a plurality of SRS resource sets, the configuration information indicating: a first set of SRS resource sets, of the plurality of SRS resource sets, associated with a first DCI format, and a second set of SRS resource sets, of the plurality of SRS resource sets, associated with a second DCI format, wherein at least one of the first set or the second set comprises at least two of the plurality of SRS resource sets (block 1010). For example, the mobile station (e.g., using communication manager 140 and/or reception component 1202, depicted in FIG. 12) may receive configuration information indicating a plurality of SRS resource sets, the configuration information indicating: a first set of SRS resource sets, of the plurality of SRS resource sets, associated with a first DCI format, and a second set of SRS resource sets, of the plurality of SRS resource sets, associated with a second DCI format, wherein at least one of the first set or the second set comprises at least two of the plurality of SRS resource sets, as described above.

As further shown in FIG. 10, in some aspects, process 1000 may include transmitting, based at least in part on the configuration information, at least one uplink communication using at least one SRS resource of at least one of the SRS resource sets of at least one of the first set or the second set (block 1020). For example, the mobile station (e.g., using communication manager 140 and/or transmission component 1204, depicted in FIG. 12) may transmit, based at least in part on the configuration information, at least one uplink communication using at least one SRS resource of at least one of the SRS resource sets of at least one of the first set or the second set, as described above.

Process 1000 may include additional aspects, such as any single aspect or any combination of aspects described below and/or in connection with one or more other processes described elsewhere herein.

In a first aspect, process 1000 includes configuring, by the mobile station and based at least in part on the configuration information, the mobile station to use the first set or the second set for transmission of the at least one uplink communication based at least in part on a format of received DCI having one of the first DCI format or the second DCI format, the received DCI being associated with scheduling the uplink communication.

In a second aspect, alone or in combination with the first aspect, process 1000 includes receiving, by the mobile station and from a base station, DCI, a format of the received DCI being the first DCI format or the second DCI format, and selecting, by the mobile station, the at least one SRS resource based at least in part on the format of the received DCI.

In a third aspect, alone or in combination with one or more of the first and second aspects, selecting the SRS resource comprises selecting the at least one SRS resource from one or more SRS resource sets of the first set when the format of the received DCI is associated with the first DCI format, or selecting the at least one SRS resource from one or more SRS resource sets of the second set when the format of the received DCI is associated with the second DCI format.

In a fourth aspect, alone or in combination with one or more of the first through third aspects, process 1000 includes scheduling, by the mobile station, physical uplink shared channel (PUSCH) repetitions that comprise the at least one uplink communication, wherein the PUSCH repetitions are to be transmitted using at least two SRS resource sets.

In a fifth aspect, alone or in combination with one or more of the first through fourth aspects, process 1000 includes receiving, by the mobile station and from a base station, DCI, the DCI comprising a dynamic switching field indicating an order in which the PUSCH repetitions are to be transmitted, wherein scheduling PUSCH repetitions comprises scheduling the PUSCH repetitions based at least in part on a value of the dynamic switching field.

In a sixth aspect, alone or in combination with one or more of the first through fifth aspects, transmitting the at least one uplink communication comprises transmitting at least one set of the PUSCH repetitions to a first transmit receive point (TRP), and transmitting at least one other set of the PUSCH repetitions to a second TRP.

In a seventh aspect, alone or in combination with one or more of the first through sixth aspects, an SRS resource set of the second set comprises SRS resources that match other SRS resources of another SRS resource set of the first set.

In an eighth aspect, alone or in combination with one or more of the first through seventh aspects, the configuration information further indicates at least one rule specifying an order in which PUSCH communications are to be transmitted, the order being based at least in part on a received DCI format, and transmitting the at least one uplink communication comprises transmitting the at least one uplink communication based at least in part on the at least one rule.

In a ninth aspect, alone or in combination with one or more of the first through eighth aspects, the first set of SRS resource sets comprises two SRS resource sets, and the second set of SRS resource sets comprises two SRS resource sets.

In a tenth aspect, alone or in combination with one or more of the first through ninth aspects, the first set of SRS resource sets comprises two SRS resource sets, and the second set of SRS resource sets comprises one SRS resource set.

In an eleventh aspect, alone or in combination with one or more of the first through tenth aspects, the first set of SRS resource sets comprises one SRS resource set, and the second set of SRS resource sets comprises two SRS resource sets.

In a twelfth aspect, alone or in combination with one or more of the first through eleventh aspects, the configuration information further indicates that the first DCI format is associated with a first dynamic switching field, and the second DCI format is associated with a second dynamic switching field.

In a thirteenth aspect, alone or in combination with one or more of the first through twelfth aspects, the at least one uplink communication comprises a first uplink communication, and the configuration information further indicates that the mobile station is to transmit the first uplink communication using an SRS resource of a first SRS resource set of the first set or the second set based at least in part on the first SRS resource set being associated with a lowest SRS resource set identifier of SRS resource set identifiers of the first set or the second set.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
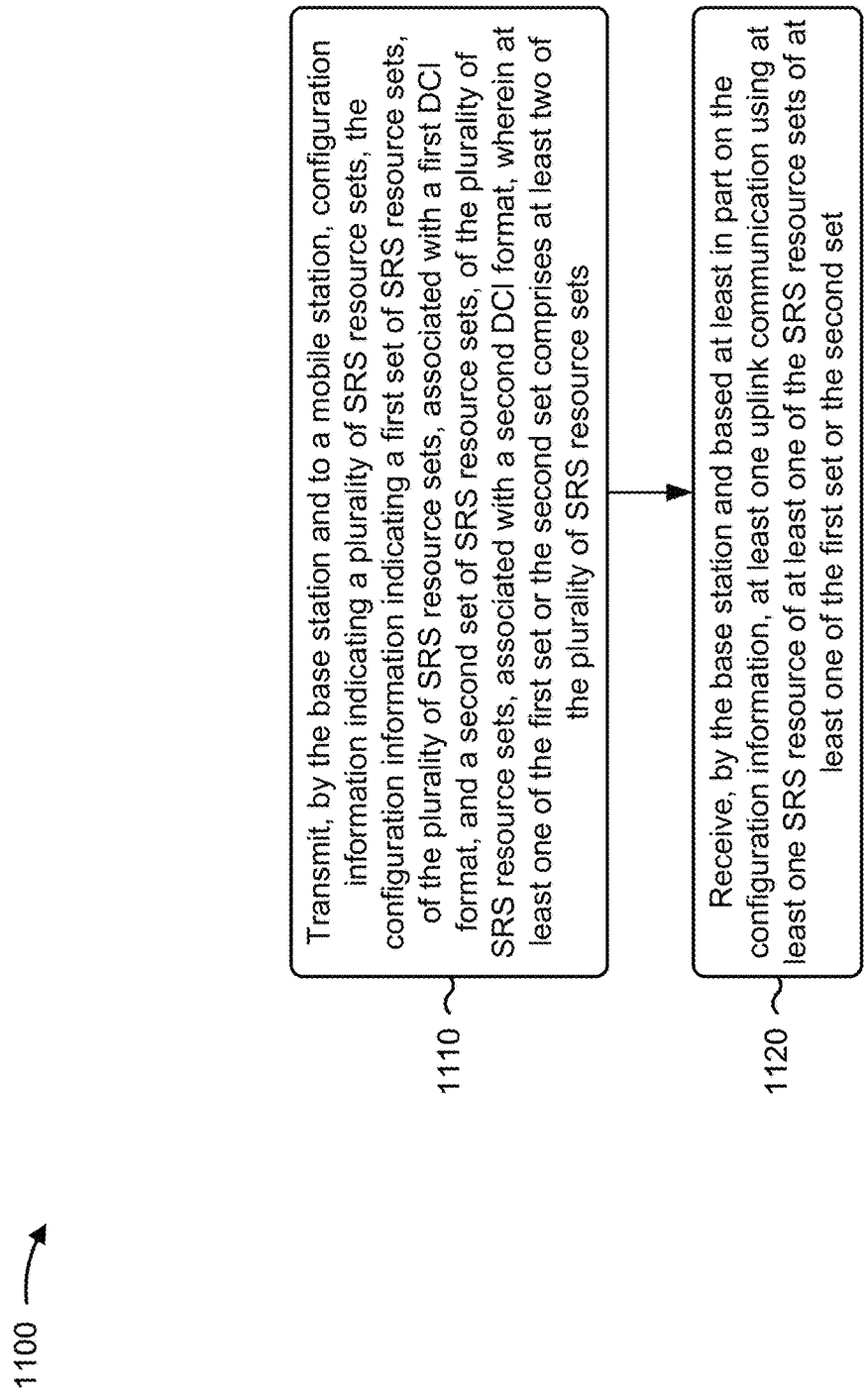

FIG. 11 is a diagram illustrating an example process 1100 performed, for example, by a base station, in accordance with the present disclosure. Example process 1100 is an example where the base station (e.g., base station 110) performs operations associated with communications associated with different sounding reference signal resource sets.

As shown in FIG. 11, in some aspects, process 1100 may include transmitting, to a mobile station, configuration information indicating a plurality of SRS resource sets, the configuration information indicating: a first set of SRS resource sets, of the plurality of SRS resource sets, associated with a first DCI format, and a second set of SRS resource sets, of the plurality of SRS resource sets, associated with a second DCI format, wherein at least one of the first set or the second set comprises at least two of the plurality of SRS resource sets (block 1110). For example, the base station (e.g., using communication manager 150 and/or transmission component 1304, depicted in FIG. 13) may transmit, to a mobile station, configuration information indicating a plurality of SRS resource sets, the configuration information indicating: a first set of SRS resource sets, of the plurality of SRS resource sets, associated with a first DCI format, and a second set of SRS resource sets, of the plurality of SRS resource sets, associated with a second DCI format, wherein at least one of the first set or the second set comprises at least two of the plurality of SRS resource sets, as described above.

As further shown in FIG. 11, in some aspects, process 1100 may include receiving, based at least in part on the configuration information, at least one uplink communication using at least one SRS resource of at least one of the SRS resource sets of at least one of the first set or the second set (block 1120). For example, the base station (e.g., using communication manager 150 and/or reception component 1302, depicted in FIG. 13) may receive, based at least in part on the configuration information, at least one uplink communication using at least one SRS resource of at least one of the SRS resource sets of at least one of the first set or the second set, as described above.

Process 1100 may include additional aspects, such as any single aspect or any combination of aspects described below and/or in connection with one or more other processes described elsewhere herein.

In a first aspect, the configuration information indicates that the mobile station is to use the first set or the second set for transmission of the at least one uplink communication based at least in part on a format of received DCI having one of the first DCI format or the second DCI format, the received DCI being associated with scheduling the uplink communication.

In a second aspect, alone or in combination with the first aspect, process 1100 includes transmitting, by the base station and to the mobile station, DCI, a format of the transmitted DCI being the first DCI format or the second DCI format.

In a third aspect, alone or in combination with one or more of the first and second aspects, the configuration information indicates that the mobile station is to select the at least one SRS resource from one or more SRS resource sets of the first set when the format of the transmitted DCI is associated with the first DCI format, or select the at least one SRS resource from one or more SRS resource sets of the second set when the format of the transmitted DCI is associated with the second DCI format.

In a fourth aspect, alone or in combination with one or more of the first through third aspects, process 1100 includes transmitting, by the base station and to the mobile station, DCI, the DCI comprising a dynamic switching field indicating an order in which PUSCH repetitions are to be transmitted.

In a fifth aspect, alone or in combination with one or more of the first through fourth aspects, an SRS resource set of the second set comprises SRS resources that match other SRS resources of another SRS resource set of the first set.

In a sixth aspect, alone or in combination with one or more of the first through fifth aspects, the configuration information further indicates at least one rule specifying an order in which PUSCH communications are to be transmitted, the order being based at least in part on a received DCI format.

In a seventh aspect, alone or in combination with one or more of the first through sixth aspects, the first set of SRS resource sets comprises two SRS resource sets, and the second set of SRS resource sets comprises two SRS resource sets.

In an eighth aspect, alone or in combination with one or more of the first through seventh aspects, the first set of SRS resource sets comprises two SRS resource sets, and the second set of SRS resource sets comprises one SRS resource set.

In a ninth aspect, alone or in combination with one or more of the first through eighth aspects, the first set of SRS resource sets comprises one SRS resource set, and the second set of SRS resource sets comprises two SRS resource sets.

In a tenth aspect, alone or in combination with one or more of the first through ninth aspects, the configuration information further indicates that the first DCI format is associated with a first dynamic switching field, and the second DCI format is associated with a second dynamic switching field.

In an eleventh aspect, alone or in combination with one or more of the first through tenth aspects, the at least one uplink communication comprises a first uplink communication, and the configuration information further indicates that the mobile station is to transmit the first uplink communication using an SRS resource of a first SRS resource set of the first set or the second set based at least in part on the first SRS resource set being associated with a lowest SRS resource set identifier of SRS resource set identifiers of the first set or the second set.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Some techniques and apparatuses described herein enable a mobile station to be separately configured to schedule multi-TRP transmission for different DCI formats without increasing mobile station complexity involved in determining which SRS resources and/or SRS resource sets are to be used for PUSCH repetitions scheduled by the different DCI formats. For example, the mobile station may be configured with a first set of SRS resource sets for a first DCI format (e.g., DCI format 0_1) and a second set of SRS resource sets for a second DCI format (e.g., DCI format 0_2). For example, the SRS resource sets of the second set (e.g., for DCI format 0_2) may include the first N SRS resources of the corresponding SRS resource sets of the first set (e.g., for DCI format 0_1), and an order in which uplink communications are transmitted may be determined based on a lowest SRS resource set identifier being transmitted first. When DCI scheduling uplink communications (e.g., PUSCH repetition(s)) is received, the mobile station may select the SRS resources used for the uplink communications based on the format of the DCI. This may enable the mobile station to schedule PUSCH repetitions for multiple DCI formats and for multiple TRPs using the same rule (e.g., lowest SRS resource set identifier first) for each DCI format. This may reduce the complexity for the mobile station handling DCI scheduling uplink communications, conserving resources of the mobile station (e.g., processing resources, power resources, and/or the like) and enabling efficient multi-TRP network communications, which may reduce wireless network congestion and lead to improved communications quality on the wireless network.

Figure 12:
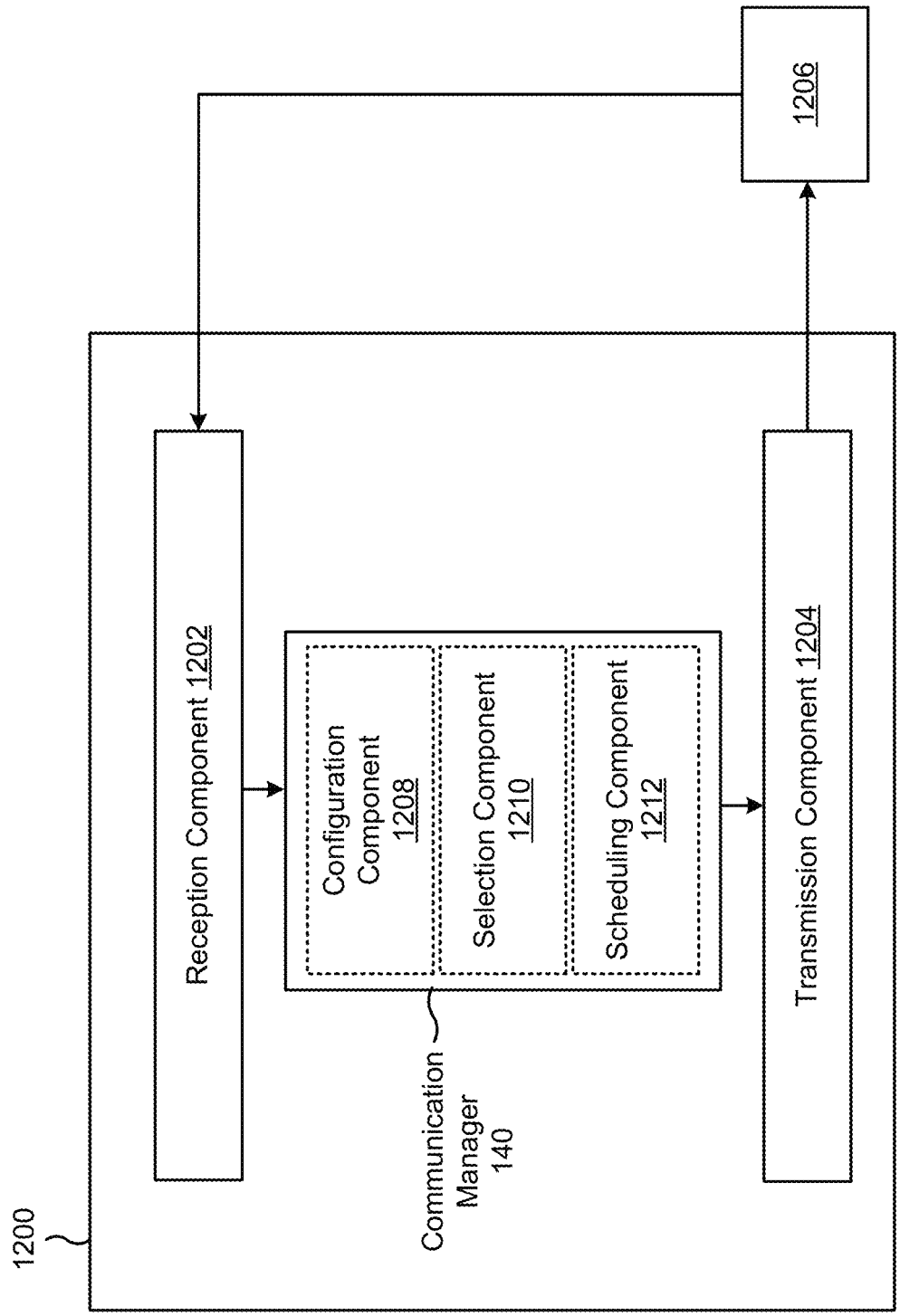
FIGS. 12 and 13 are diagrams of example apparatuses for wireless communication, in accordance with the present disclosure.

FIG. 12 is a diagram of an example apparatus 1200 for wireless communication. The apparatus 1200 may be a UE (e.g., a mobile station), or a UE may include the apparatus 1200. In some aspects, the apparatus 1200 includes a reception component 1202 and a transmission component 1204, which may be in communication with one another (for example, via one or more buses and/or one or more other components). As shown, the apparatus 1200 may communicate with another apparatus 1206 (such as a UE, a base station, or another wireless communication device) using the reception component 1202 and the transmission component 1204. As further shown, the apparatus 1200 may include the communication manager 140. The communication manager 140 may include one or more of a configuration component 1208, a selection component 1210, or a scheduling component 1212, among other examples.

In some aspects, the apparatus 1200 may be configured to perform one or more operations described herein in connection with FIGS. 3-9. Additionally, or alternatively, the apparatus 1200 may be configured to perform one or more processes described herein, such as process 1000 of FIG. 10. In some aspects, the apparatus 1200 and/or one or more components shown in FIG. 12 may include one or more components of the UE described in connection with FIG. 2. Additionally, or alternatively, one or more components shown in FIG. 12 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1202 may receive communications, such as reference signals, control information, data communications, or a combination thereof, from the apparatus 1206. The reception component 1202 may provide received communications to one or more other components of the apparatus 1200. In some aspects, the reception component 1202 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1200. In some aspects, the reception component 1202 may include one or more antennas, a modem, a demodulator, a MIMO detector, a receive processor, a controller/processor, a memory, or a combination thereof, of the UE described in connection with FIG. 2.

The transmission component 1204 may transmit communications, such as reference signals, control information, data communications, or a combination thereof, to the apparatus 1206. In some aspects, one or more other components of the apparatus 1200 may generate communications and may provide the generated communications to the transmission component 1204 for transmission to the apparatus 1206. In some aspects, the transmission component 1204 may perform signal processing on the generated communications (such as filtering, amplification, modulation, digital-to-analog conversion, multiplexing, interleaving, mapping, or encoding, among other examples), and may transmit the processed signals to the apparatus 1206. In some aspects, the transmission component 1204 may include one or more antennas, a modem, a modulator, a transmit MIMO processor, a transmit processor, a controller/processor, a memory, or a combination thereof, of the UE described in connection with FIG. 2. In some aspects, the transmission component 1204 may be co-located with the reception component 1202 in a transceiver.

The reception component 1202 may receive configuration information indicating a plurality of SRS resource sets, the configuration information indicating a first set of SRS resource sets, of the plurality of SRS resource sets, associated with a first DCI format, and a second set of SRS resource sets, of the plurality of SRS resource sets, associated with a second DCI format, wherein at least one of the first set or the second set comprises at least two of the plurality of SRS resource sets. The transmission component 1204 may transmit, based at least in part on the configuration information, at least one uplink communication using at least one SRS resource of at least one of the SRS resource sets of at least one of the first set or the second set.

The configuration component 1208 may configure, based at least in part on the configuration information, the mobile station to use the first set or the second set for transmission of the at least one uplink communication based at least in part on a format of received DCI having one of the first DCI format or the second DCI format the received DCI being associated with scheduling the uplink communication.

The reception component 1202 may receive, from a base station, DCI, a format of the received DCI being the first DCI format or the second DCI format.

The selection component 1210 may select the at least one SRS resource based at least in part on the format of the received DCI.

The scheduling component 1212 may schedule PUSCH repetitions that comprise the at least one uplink communication.

The reception component 1202 may receive, from a base station, DCI, the DCI comprising a dynamic switching field indicating an order in which the PUSCH repetitions are to be transmitted.

The number and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally, or alternatively, a set of (one or more) components shown in FIG. 12 may perform one or more functions described as being performed by another set of components shown in FIG. 12.

Figure 13:
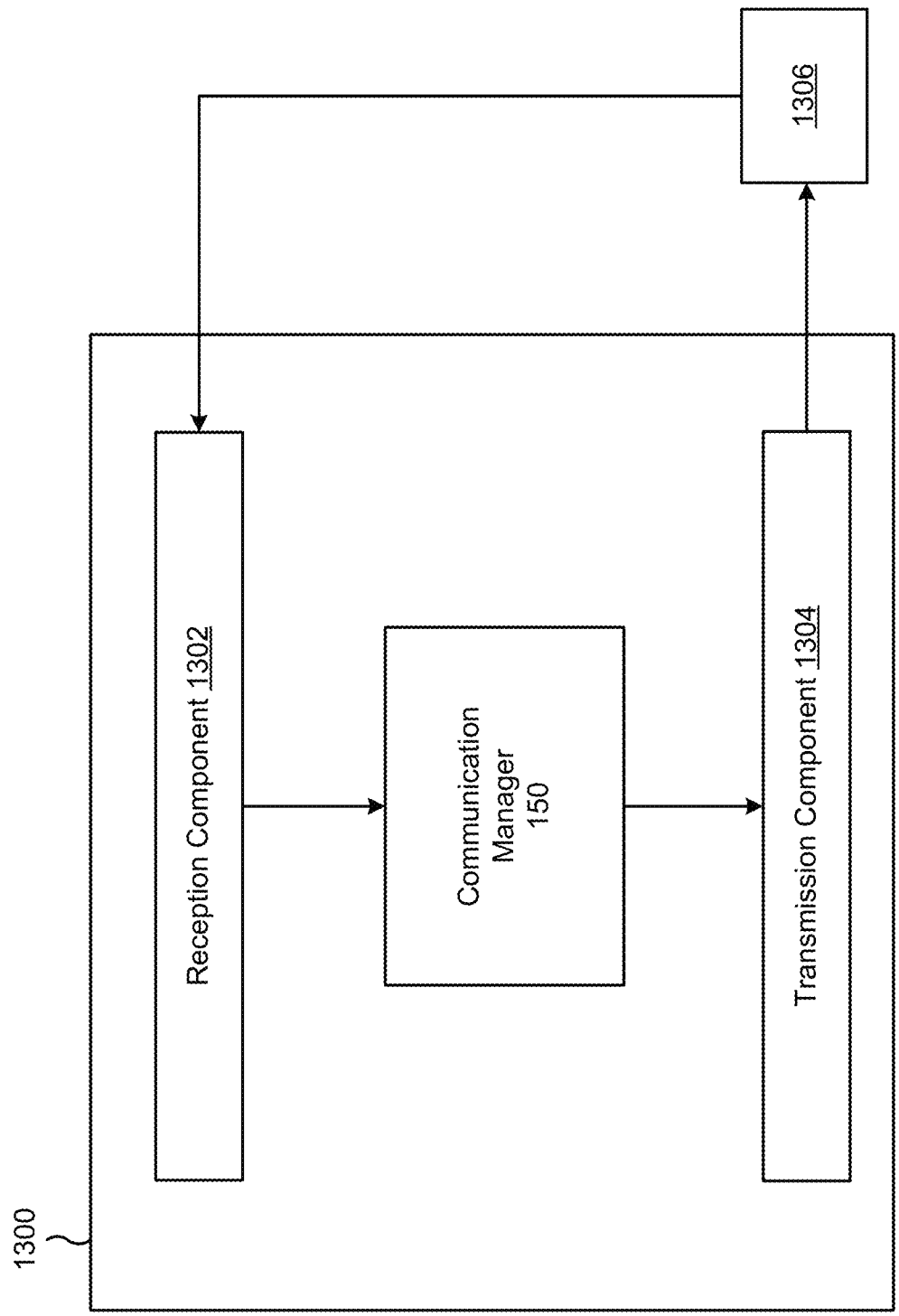

FIG. 13 is a diagram of an example apparatus 1300 for wireless communication. The apparatus 1300 may be a base station, or a base station may include the apparatus 1300. In some aspects, the apparatus 1300 includes a reception component 1302 and a transmission component 1304, which may be in communication with one another (for example, via one or more buses and/or one or more other components). As shown, the apparatus 1300 may communicate with another apparatus 1306 (such as a UE, a base station, or another wireless communication device) using the reception component 1302 and the transmission component 1304. As further shown, the apparatus 1300 may include the communication manager 150.

In some aspects, the apparatus 1300 may be configured to perform one or more operations described herein in connection with FIGS. 3-9. Additionally, or alternatively, the apparatus 1300 may be configured to perform one or more processes described herein, such as process 1100 of FIG. 11. In some aspects, the apparatus 1300 and/or one or more components shown in FIG. 13 may include one or more components of the base station described in connection with FIG. 2. Additionally, or alternatively, one or more components shown in FIG. 13 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1302 may receive communications, such as reference signals, control information, data communications, or a combination thereof, from the apparatus 1306. The reception component 1302 may provide received communications to one or more other components of the apparatus 1300. In some aspects, the reception component 1302 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1300. In some aspects, the reception component 1302 may include one or more antennas, a modem, a demodulator, a MIMO detector, a receive processor, a controller/processor, a memory, or a combination thereof, of the base station described in connection with FIG. 2.

The transmission component 1304 may transmit communications, such as reference signals, control information, data communications, or a combination thereof, to the apparatus 1306. In some aspects, one or more other components of the apparatus 1300 may generate communications and may provide the generated communications to the transmission component 1304 for transmission to the apparatus 1306. In some aspects, the transmission component 1304 may perform signal processing on the generated communications (such as filtering, amplification, modulation, digital-to-analog conversion, multiplexing, interleaving, mapping, or encoding, among other examples), and may transmit the processed signals to the apparatus 1306. In some aspects, the transmission component 1304 may include one or more antennas, a modem, a modulator, a transmit MIMO processor, a transmit processor, a controller/processor, a memory, or a combination thereof, of the base station described in connection with FIG. 2. In some aspects, the transmission component 1304 may be co-located with the reception component 1302 in a transceiver.

The transmission component 1304 may transmit, to a mobile station, configuration information indicating a plurality of SRS resource sets, the configuration information indicating a first set of SRS resource sets, of the plurality of SRS resource sets, associated with a first DCI format, and a second set of SRS resource sets, of the plurality of SRS resource sets, associated with a second DCI format, wherein at least one of the first set or the second set comprises at least two of the plurality of SRS resource sets. The reception component 1302 may receive, based at least in part on the configuration information, at least one uplink communication using at least one SRS resource of at least one of the SRS resource sets of at least one of the first set or the second set.

The transmission component 1304 may transmit, to the mobile station, DCI, a format of the transmitted DCI being the first DCI format or the second DCI format.

The transmission component 1304 may transmit, to the mobile station, DCI, the DCI comprising a dynamic switching field indicating an order in which PUSCH repetitions are to be transmitted.

The number and arrangement of components shown in FIG. 13 are provided as an example. In practice, there may be additional components, fewer components, different components, or differently arranged components than those shown in FIG. 13. Furthermore, two or more components shown in FIG. 13 may be implemented within a single component, or a single component shown in FIG. 13 may be implemented as multiple, distributed components. Additionally, or alternatively, a set of (one or more) components shown in FIG. 13 may perform one or more functions described as being performed by another set of components shown in FIG. 13.

The following provides an overview of some Aspects of the present disclosure:

Aspect 1: A method of wireless communication performed by a mobile station, comprising: receiving, by the mobile station, configuration information indicating a plurality of SRS resource sets, the configuration information indicating: a first set of SRS resource sets, of the plurality of SRS resource sets, associated with a first DCI format, and a second set of SRS resource sets, of the plurality of SRS resource sets, associated with a second DCI format, wherein at least one of the first set or the second set comprises at least two of the plurality of SRS resource sets; and transmitting, by the mobile station and based at least in part on the configuration information, at least one uplink communication using at least one SRS resource of at least one of the SRS resource sets of at least one of the first set or the second set.

Aspect 2: The method of Aspect 1, further comprising: configuring, by the mobile station and based at least in part on the configuration information, the mobile station to use the first set or the second set for transmission of the at least one uplink communication based at least in part on a format of received DCI having one of the first DCI format or the second DCI format, the received DCI being associated with scheduling the at least one uplink communication.

Aspect 3: The method of any of Aspects 1-2, further comprising: receiving, by the mobile station and from a base station, DCI, a format of the received DCI being the first DCI format or the second DCI format; and selecting, by the mobile station, the at least one SRS resource based at least in part on the format of the received DCI.

Aspect 4: The method of Aspect 3, wherein selecting the SRS resource comprises: selecting, by the mobile station, the at least one SRS resource from one or more SRS resource sets of the first set when the format of the received DCI is associated with the first DCI format, or selecting, by the mobile station, the at least one SRS resource from one or more SRS resource sets of the second set when the format of the received DCI is associated with the second DCI format.

Aspect 5: The method of any of Aspects 1-4, further comprising: scheduling, by the mobile station, physical uplink shared channel (PUSCH) repetitions that comprise the at least one uplink communication, wherein the PUSCH repetitions are to be transmitted using at least two SRS resource sets.

Aspect 6: The method of Aspect 5, further comprising: receiving, by the mobile station and from a base station, DCI, the DCI comprising a dynamic switching field indicating an order in which the PUSCH repetitions are to be transmitted, wherein scheduling PUSCH repetitions comprises: scheduling the PUSCH repetitions based at least in part on a value of the dynamic switching field. wherein scheduling PUSCH repetitions comprises: scheduling the PUSCH repetitions based at least in part on a value of the dynamic switching field.

Aspect 7: The method of Aspect 6, wherein transmitting the at least one uplink communication comprises: transmitting at least one set of the PUSCH repetitions to a first transmit receive point (TRP); and transmitting at least one other set of the PUSCH repetitions to a second TRP.

Aspect 8: The method of any of Aspects 1-7, wherein an SRS resource set of the second set comprises SRS resources that match other SRS resources of another SRS resource set of the first set.

Aspect 9: The method of any of Aspects 1-8, wherein the configuration information further indicates at least one rule specifying an order in which physical uplink shared channel (PUSCH) communications are to be transmitted, the order being based at least in part on a received DCI format; and wherein transmitting the at least one uplink communication comprises: transmitting the at least one uplink communication based at least in part on the at least one rule.

Aspect 10: The method of any of Aspects 1-9, wherein the first set of SRS resource sets comprises two SRS resource sets, and the second set of SRS resource sets comprises two SRS resource sets.

Aspect 11: The method of any of Aspects 1-10, wherein the first set of SRS resource sets comprises two SRS resource sets, and the second set of SRS resource sets comprises one SRS resource set.

Aspect 12: The method of any of Aspects 1-11, wherein the first set of SRS resource sets comprises one SRS resource set, and the second set of SRS resource sets comprises two SRS resource sets.

Aspect 13: The method of any of Aspects 1-12, wherein the configuration information further indicates that the first DCI format is associated with a first dynamic switching field, and the second DCI format is associated with a second dynamic switching field.

Aspect 14: The method of any of Aspects 1-13, wherein the at least one uplink communication comprises a first uplink communication, and wherein the configuration information further indicates that the mobile station is to transmit the first uplink communication using an SRS resource of a first SRS resource set of the first set or the second set based at least in part on the first SRS resource set being associated with a lowest SRS resource set identifier of SRS resource set identifiers of the first set or the second set.

Aspect 15: A method of wireless communication performed by a base station, comprising: transmitting, by the base station and to a mobile station, configuration information indicating a plurality of SRS resource sets, the configuration information indicating: a first set of SRS resource sets, of the plurality of SRS resource sets, associated with a first DCI format, and a second set of SRS resource sets, of the plurality of SRS resource sets, associated with a second DCI format, wherein at least one of the first set or the second set comprises at least two of the plurality of SRS resource sets; and receiving, by the base station and based at least in part on the configuration information, at least one uplink communication using at least one SRS resource of at least one of the SRS resource sets of at least one of the first set or the second set.

Aspect 16: The method of Aspect 15, wherein the configuration information indicates that the mobile station is to use the first set or the second set for transmission of the at least one uplink communication based at least in part on a format of received DCI having one of the first DCI format or the second DCI format, the received DCI being associated with scheduling the at least one uplink communication.

Aspect 17: The method of any of Aspects 15-16, further comprising: transmitting, by the base station and to the mobile station, DCI, a format of the transmitted DCI being the first DCI format or the second DCI format.

Aspect 18: The method of Aspect 17, wherein the configuration information indicates that the mobile station is to: select the at least one SRS resource from one or more SRS resource sets of the first set when the format of the transmitted DCI is associated with the first DCI format, or select the at least one SRS resource from one or more SRS resource sets of the second set when the format of the transmitted DCI is associated with the second DCI format.

Aspect 19: The method of any of Aspects 15-18, further comprising: transmitting, by the base station and to the mobile station, DCI, the DCI comprising a dynamic switching field indicating an order in which physical uplink shared channel (PUSCH) repetitions are to be transmitted.

Aspect 20: The method of any of Aspects 15-19, wherein an SRS resource set of the second set comprises SRS resources that match other SRS resources of another SRS resource set of the first set.

Aspect 21: The method of any of Aspects 15-20, wherein the configuration information further indicates at least one rule specifying an order in which physical uplink shared channel (PUSCH) communications are to be transmitted, the order being based at least in part on a received DCI format.

Aspect 22: The method of any of Aspects 15-21, wherein the first set of SRS resource sets comprises two SRS resource sets, and the second set of SRS resource sets comprises two SRS resource sets.

Aspect 23: The method of any of Aspects 15-22, wherein the first set of SRS resource sets comprises two SRS resource sets, and the second set of SRS resource sets comprises one SRS resource set.

Aspect 24: The method of any of Aspects 15-23, wherein the first set of SRS resource sets comprises one SRS resource set, and the second set of SRS resource sets comprises two SRS resource sets.

Aspect 25: The method of any of Aspects 15-24, wherein the configuration information further indicates that the first DCI format is associated with a first dynamic switching field, and the second DCI format is associated with a second dynamic switching field.

Aspect 26: The method of any of Aspects 15-25, wherein the at least one uplink communication comprises a first uplink communication, and wherein the configuration information further indicates that the mobile station is to transmit the first uplink communication using an SRS resource of a first SRS resource set of the first set or the second set based at least in part on the first SRS resource set being associated with a lowest SRS resource set identifier of SRS resource set identifiers of the first set or the second set.

Aspect 27: An apparatus for wireless communication at a device, comprising a processor; memory coupled with the processor; and instructions stored in the memory and executable by the processor to cause the apparatus to perform the method of one or more of Aspects 1-14.

Aspect 28: An apparatus for wireless communication at a device, comprising a processor; memory coupled with the processor; and instructions stored in the memory and executable by the processor to cause the apparatus to perform the method of one or more of Aspects 15-26.

Aspect 29: A device for wireless communication, comprising a memory and one or more processors coupled to the memory, the one or more processors configured to perform the method of one or more of Aspects 1-14.

Aspect 30: A device for wireless communication, comprising a memory and one or more processors coupled to the memory, the one or more processors configured to perform the method of one or more of Aspects 15-26.

Aspect 31: An apparatus for wireless communication, comprising at least one means for performing the method of one or more of Aspects 1-14.

Aspect 32: An apparatus for wireless communication, comprising at least one means for performing the method of one or more of Aspects 15-26.

Aspect 33: A non-transitory computer-readable medium storing code for wireless communication, the code comprising instructions executable by a processor to perform the method of one or more of Aspects 1-14.

Aspect 34: A non-transitory computer-readable medium storing code for wireless communication, the code comprising instructions executable by a processor to perform the method of one or more of Aspects 15-26.

Aspect 35: A non-transitory computer-readable medium storing a set of instructions for wireless communication, the set of instructions comprising one or more instructions that, when executed by one or more processors of a device, cause the device to perform the method of one or more of Aspects 1-14.

Aspect 36: A non-transitory computer-readable medium storing a set of instructions for wireless communication, the set of instructions comprising one or more instructions that, when executed by one or more processors of a device, cause the device to perform the method of one or more of Aspects 15-26.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a mobile station, comprising:
   receiving, by the mobile station, configuration information indicating a plurality of sounding reference signal (SRS) resource sets, the configuration information indicating:
      a first set of SRS resource sets, of the plurality of SRS resource sets, associated with a first downlink control information (DCI) format,
         wherein the first set includes multiple SRS resource sets of the plurality of SRS resource sets, and
      a second set of SRS resource sets, of the plurality of SRS resource sets, associated with a second DCI format,
         wherein an SRS resource set of the second set comprises a subset of SRS resources that are included in a corresponding SRS resource set of the first set, and
         wherein the subset of SRS resources, included in the SRS resource set of the second set, comprises a first N SRS resources included in the corresponding SRS resource set of the first set; and
   transmitting, by the mobile station and based at least in part on the configuration information, at least one uplink communication using at least one SRS resource of at least one of the SRS resource sets of at least one of the first set or the second set.

2. The method of claim 1, further comprising:
   configuring, by the mobile station and based at least in part on the configuration information, the mobile station to use the first set or the second set for transmission of the at least one uplink communication based at least in part on a format of received DCI having one of the first DCI format or the second DCI format,
      the received DCI being associated with scheduling the at least one uplink communication.

3. The method of claim 1, further comprising:
   receiving, by the mobile station and from a base station, DCI,
      a format of the received DCI being the first DCI format or the second DCI format; and
   selecting, by the mobile station, the at least one SRS resource based at least in part on the format of the received DCI.

4. The method of claim 1, further comprising:
   scheduling, by the mobile station, physical uplink shared channel (PUSCH) repetitions that comprise the at least one uplink communication,
      wherein the PUSCH repetitions are to be transmitted using at least two SRS resource sets.

5. The method of claim 4, further comprising:
   receiving, by the mobile station and from a base station, DCI,
      the DCI comprising a dynamic switching field indicating an order in which the PUSCH repetitions are to be transmitted,
   wherein scheduling PUSCH repetitions comprises:
      scheduling the PUSCH repetitions based at least in part on a value of the dynamic switching field.

6. The method of claim 1, wherein another SRS resource set of the second set comprises SRS resources that match other SRS resources of another corresponding SRS resource set of the first set.

7. The method of claim 1, wherein the configuration information further indicates at least one rule specifying an order in which physical uplink shared channel (PUSCH)

communications are to be transmitted, the order being based at least in part on a received DCI format; and
wherein transmitting the at least one uplink communication comprises:
transmitting the at least one uplink communication based at least in part on the at least one rule.

8. The method of claim 1, wherein the first set of SRS resource sets comprises two SRS resource sets, and
the second set of SRS resource sets comprises two SRS resource sets.

9. The method of claim 1, wherein the first set of SRS resource sets comprises two SRS resource sets, and
the second set of SRS resource sets comprises one SRS resource set.

10. The method of claim 1, wherein the configuration information further indicates that the first DCI format is associated with a first dynamic switching field, and the second DCI format is associated with a second dynamic switching field.

11. The method of claim 1, wherein the at least one uplink communication comprises a first uplink communication, and
wherein the configuration information further indicates that the mobile station is to transmit the first uplink communication using an SRS resource of a first SRS resource set of the first set or the second set based at least in part on the first SRS resource set being associated with a lowest SRS resource set identifier of SRS resource set identifiers of the first set or the second set.

12. A method of wireless communication performed by a base station, comprising:
transmitting, by the base station and to a mobile station, configuration information indicating a plurality of sounding reference signal (SRS) resource sets, the configuration information indicating:
a first set of SRS resource sets, of the plurality of SRS resource sets, associated with a first downlink control information (DCI) format,
wherein the first set includes multiple SRS resource sets of the plurality of SRS resource sets, and
a second set of SRS resource sets, of the plurality of SRS resource sets, associated with a second DCI format,
wherein an SRS resource set of the second set comprises a subset of SRS resources that are included in a corresponding SRS resource set of the first set, and
wherein the subset of SRS resources, included in the SRS resource set of the second set, comprises a first N SRS resources included in the corresponding SRS resource set of the first set; and
receiving, by the base station and based at least in part on the configuration information, at least one uplink communication using at least one SRS resource of at least one of the SRS resource sets of at least one of the first set or the second set.

13. The method of claim 12, wherein the configuration information indicates that the mobile station is to use the first set or the second set for transmission of the at least one uplink communication based at least in part on a format of received DCI having one of the first DCI format or the second DCI format,
the received DCI being associated with scheduling the at least one uplink communication.

14. The method of claim 12, further comprising:
transmitting, by the base station and to the mobile station, DCI,
a format of the transmitted DCI being the first DCI format or the second DCI format.

15. The method of claim 12, further comprising:
transmitting, by the base station and to the mobile station, DCI,
the DCI comprising a dynamic switching field indicating an order in which physical uplink shared channel (PUSCH) repetitions are to be transmitted.

16. The method of claim 12, wherein another SRS resource set of the second set comprises SRS resources that match other SRS resources of another corresponding SRS resource set of the first set.

17. The method of claim 12, wherein the configuration information further indicates at least one rule specifying an order in which physical uplink shared channel (PUSCH) communications are to be transmitted, the order being based at least in part on a received DCI format.

18. The method of claim 12, wherein the first set of SRS resource sets comprises two SRS resource sets, and
the second set of SRS resource sets comprises two SRS resource sets.

19. The method of claim 12, wherein the first set of SRS resource sets comprises two SRS resource sets, and
the second set of SRS resource sets comprises one SRS resource set.

20. The method of claim 12, wherein the first set of SRS resource sets comprises one SRS resource set, and
the second set of SRS resource sets comprises two SRS resource sets.

21. The method of claim 12, wherein the configuration information further indicates that the first DCI format is associated with a first dynamic switching field, and the second DCI format is associated with a second dynamic switching field.

22. The method of claim 12, wherein the at least one uplink communication comprises a first uplink communication, and
wherein the configuration information further indicates that the mobile station is to transmit the first uplink communication using an SRS resource of a first SRS resource set of the first set or the second set based at least in part on the first SRS resource set being associated with a lowest SRS resource set identifier of SRS resource set identifiers of the first set or the second set.

23. A mobile station for wireless communication, comprising:
a memory; and
one or more processors, coupled to the memory, configured to, based in part on information stored in the memory:
receive configuration information indicating a plurality of sounding reference signal (SRS) resource sets, the configuration information indicating:
a first set of SRS resource sets, of the plurality of SRS resource sets, associated with a first downlink control information (DCI) format,
wherein the first set includes multiple SRS resource sets of the plurality of SRS resource sets, and
a second set of SRS resource sets, of the plurality of SRS resource sets, associated with a second DCI format, wherein an SRS resource set of the second set comprises a subset of SRS resources that are included in a corresponding SRS resource set of the first set, and wherein the subset of SRS resources, included in the SRS resource set of the second set, comprises a first N SRS resources included in the corresponding SRS resource set of the first set; and transmit, based at least in part on the configuration information, at least one uplink communication using at least one SRS resource of at least one of the SRS resource sets of at least one of the first set or the second set.

24. The mobile station of claim 23, wherein the one or more processors are further configured to:

configure, based at least in part on the configuration information, the mobile station to use the first set or the second set for transmission of the at least one uplink communication based at least in part on a format of received DCI having one of the first DCI format or the second DCI format, the received DCI being associated with scheduling the at least one uplink communication.

25. The mobile station of claim 23, wherein the first DCI format indicates a first one of one or two resource sets, the second DCI format indicates a second one of one or two resource sets different from the first one.

26. The mobile station of claim 23, wherein the first set of SRS resource sets comprises two SRS resource sets, and the second set of SRS resource sets comprises two SRS resource sets.

27. The mobile station of claim 23, wherein the first set of SRS resource sets comprises two SRS resource sets, and the second set of SRS resource sets comprises one SRS resource set.

28. A base station for wireless communication, comprising:

a memory; and one or more processors, coupled to the memory, configured to, based in part on information stored in the memory:

transmit, to a mobile station, configuration information indicating a plurality of sounding reference signal (SRS) resource sets, the configuration information indicating:

a first set of SRS resource sets, of the plurality of SRS resource sets, associated with a first downlink control information (DCI) format, wherein the first set includes multiple SRS resource sets of the plurality of SRS resource sets, and a second set of SRS resource sets, of the plurality of SRS resource sets, associated with a second DCI format, wherein an SRS resource set of the second set comprises a subset of SRS resources that are included in a corresponding SRS resource set of the first set, and wherein the subset of SRS resources, included in the SRS resource set of the second set, comprises a first N SRS resources included in the corresponding SRS resource set of the first set; and receive, based at least in part on the configuration information, at least one uplink communication using at least one SRS resource of at least one of the SRS resource sets of at least one of the first set or the second set.

29. The base station of claim 28, wherein the configuration information indicates that the mobile station is to use the first set or the second set for transmission of the at least one uplink communication based at least in part on a format of received DCI having one of the first DCI format or the second DCI format, the received DCI being associated with scheduling the at least one uplink communication.

30. The base station of claim 28, wherein the first DCI format indicates a first one of one or two resource sets, the second DCI format indicates a second one of one or two resource sets different from the first one.

* * * * *